(12) United States Patent
Kuretake

(10) Patent No.: US 11,608,806 B2
(45) Date of Patent: Mar. 21, 2023

(54) CONTROL SYSTEM FOR VEHICLE

(71) Applicant: TOYOTA JIDOSHA KABUSHIKI KAISHA, Toyota (JP)

(72) Inventor: Ken Kuretake, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/000,369

(22) Filed: Jun. 5, 2018

(65) Prior Publication Data

US 2018/0372053 A1 Dec. 27, 2018

(30) Foreign Application Priority Data

Jun. 26, 2017 (JP) .............................. JP2017-123884

(51) Int. Cl.
*F02N 11/08* (2006.01)
*B60W 50/00* (2006.01)
*G07C 5/08* (2006.01)

(52) U.S. Cl.
CPC ..... *F02N 11/0837* (2013.01); *B60W 50/0098* (2013.01); *F02N 11/0822* (2013.01); *F02N 11/0825* (2013.01); *F02N 2200/022* (2013.01); *F02N 2200/102* (2013.01); *F02N 2200/123* (2013.01); *F02N 2200/125* (2013.01); *G07C 5/0816* (2013.01)

(58) Field of Classification Search
CPC ........... F02N 11/0837; F02N 2200/123; F02N 2200/125; B60W 50/0098; G07C 5/0816
See application file for complete search history.

(56) References Cited

U.S. PATENT DOCUMENTS

| | | | | |
|---|---|---|---|---|
| 6,330,508 B1 * | 12/2001 | Akabori | ............. | B60K 31/0008 340/903 |
| 6,629,515 B1 * | 10/2003 | Yamamoto | ............. | B60K 6/543 307/10.6 |
| 2006/0009188 A1 * | 1/2006 | Kubota | ............ | G08G 1/096725 455/344 |
| 2010/0191446 A1 * | 7/2010 | McDonald | .......... | F02N 11/0837 701/113 |
| 2012/0132176 A1 * | 5/2012 | Sawada | ............... | F02N 11/0837 123/339.14 |

(Continued)

FOREIGN PATENT DOCUMENTS

| | | | | |
|---|---|---|---|---|
| CN | 105102808 A | | 11/2015 | |
| JP | 2000130209 A * | | 5/2000 | .......... F02N 11/0837 |

(Continued)

*Primary Examiner* — Logan M Kraft
*Assistant Examiner* — Joshua Campbell
(74) *Attorney, Agent, or Firm* — Oblon, McClelland, Maier & Neustadt, L.L.P.

(57) ABSTRACT

A control system is intended for a vehicle having an automatic stop-restart function that automatically stops an engine when a predetermined automatic stop condition is satisfied and restarts the engine when a predetermined restart condition is satisfied during an automatic engine stop. The control system has an automatic stop restricting function that, when the host vehicle is located in a first predetermined area before a temporary stop sign, prohibits an automatic stop of the engine. When a preceding vehicle is located in the first predetermined area, the automatic stop restricting function is deactivated.

25 Claims, 9 Drawing Sheets

(56) References Cited

U.S. PATENT DOCUMENTS

2012/0277982 A1* 11/2012 Weaver ................ F02D 41/123
701/112
2016/0061172 A1* 3/2016 Sato ...................... B60W 30/16
701/112

FOREIGN PATENT DOCUMENTS

| JP | 2001-50076 | | 2/2001 | |
|----|------------|---|--------|---|
| JP | 2001-289087 A | | 10/2001 | |
| JP | 2004218562 A | * | 8/2004 | .......... F02N 11/0837 |
| JP | 2014-194182 A | | 10/2014 | |
| JP | 2016-75251 A | | 5/2016 | |

\* cited by examiner

CONTROL SYSTEM FOR VEHICLE

CROSS-REFERENCE TO RELATED APPLICATIONS

The disclosure of Japanese Patent Application No. 2017-123884 filed on Jun. 26, 2017 including the specification, drawings and abstract is incorporated herein by reference in its entirety.

BACKGROUND

1. Technical Field

The disclosure relates to a control system for a vehicle and, more particularly, to a control system that is mounted on a vehicle having an automatic stop-restart function.

2. Description of Related Art

In order to improve fuel efficiency, there is conventionally known a vehicle having an automatic stop-restart function. The automatic stop-restart function automatically stops an engine when a predetermined automatic stop condition is satisfied, and restarts the engine when a predetermined restart condition is satisfied during an automatic engine stop.

The automatic stop-restart function is intended to be activated in a situation in which the vehicle remains stopped for several seconds to several tens of seconds, such as waiting at a traffic light and waiting at a railroad crossing; however, the automatic stop-restart function can be activated also in a situation in which the vehicle starts moving just after making a stop for confirming the safety at a temporary stop point, such as a point before a stop line or a railroad crossing.

When the automatic stop-restart function is activated in a situation in which the vehicle starts moving just after making a stop, there is a possibility of deterioration in fuel efficiency due to a brief automatic engine stop conversely or a possibility of slowness at the time of vehicle start due to a delay in startup at an engine restart.

For example, Japanese Unexamined Patent Application Publication No. 2001-050076 (JP 2001-050076 A) describes an automatic control system for an engine. The automatic control system automatically stops the engine when a predetermined stop condition is satisfied, and, when a relatively brief temporary stop is required within a predetermined distance on a traveling road of a host vehicle, determines that the predetermined stop condition is not satisfied.

SUMMARY

The automatic control system described in JP 2001-050076 A determines that the predetermined stop condition is not satisfied when a temporary stop is required within the predetermined distance on the traveling road of the host vehicle. Therefore, since the engine is not automatically stopped even when the vehicle is temporarily stopped, it is possible to reduce deterioration in fuel efficiency due to a brief automatic engine stop and prevent slowness at the time of vehicle start due to a delay in engine startup.

However, even when a temporary stop is required, the vehicle does not always start moving just after making a stop, and the vehicle can remain stopped for a certain time period. The automatic control system described in JP 2001-050076 A has such inconvenience that an opportunity to improve fuel efficiency reduces since the engine is not automatically stopped in the latter case.

In light of such circumstances, the disclosure provides a technique for, in a control system for a vehicle having an automatic stop-restart function, ensuring an opportunity to improve fuel efficiency while reducing deterioration in fuel efficiency due to a brief automatic engine stop and preventing slowness at the time of vehicle start.

An aspect of the disclosure provides a control system for a vehicle. The control system restricts an automatic stop of an engine as a rule when the vehicle stops in a predetermined area before a temporary stop point, and exceptionally removes restrictions on an automatic stop of the engine when there is a high possibility that the vehicle is kept stopped in the predetermined area.

Specifically, the control system includes an electronic control unit configured as follows. The electronic control unit is configured to (i) have an automatic stop-restart function that automatically stops an engine when a predetermined automatic stop condition is satisfied and that restarts the engine when a predetermined restart condition is satisfied during an automatic engine stop; (ii) have an automatic stop restricting function that, when the host vehicle is located in a predetermined area before a temporary stop point, prohibits an automatic stop of the engine; and (iii) when a preceding vehicle is located in the predetermined area, deactivate the automatic stop restricting function.

With the thus configured control system, when the predetermined automatic stop condition is satisfied, the automatic stop-restart function automatically stops the engine. Therefore, it is possible to improve fuel efficiency. In addition, when the host vehicle is located in the predetermined area before the temporary stop point, in other words, when the host vehicle tends to start moving just after making a stop, the automatic stop restricting function prohibits an automatic stop of the engine. Therefore, it is possible to reduce deterioration in fuel efficiency due to a brief automatic engine stop and prevent slowness at the time of vehicle start due to a delay in engine startup.

Another aspect of the disclosure provides a control system for a vehicle. The control system includes an electronic control unit configured as described below. The electronic control unit is configured to (i) have an automatic stop-restart function that automatically stops an engine when a predetermined automatic stop condition is satisfied and that restarts the engine when a predetermined restart condition is satisfied during an automatic engine stop; (ii) have an automatic stop restricting function that, when the host vehicle is located in a predetermined area before a temporary stop point, prolongs a predetermined time period from when the automatic stop condition is satisfied to when the engine is automatically stopped; and (iii) when a preceding vehicle is located in the predetermined area, deactivate the automatic stop restricting function.

With the thus configured control system, when the predetermined automatic stop condition is satisfied, the automatic stop-restart function automatically stops the engine. Therefore, it is possible to improve fuel efficiency. In addition, when the host vehicle is located in the predetermined area before the temporary stop point, in other words, when the host vehicle tends to start moving just after making a stop, the automatic stop restricting function delays an automatic stop of the engine. Therefore, it is possible to reduce deterioration in fuel efficiency due to a brief automatic engine stop and prevent slowness at the time of vehicle start due to a delay in engine startup.

Of course, when a preceding vehicle is located in the predetermined area in which the host vehicle tends to start moving just after making a stop, the host vehicle needs to wait to start moving until the preceding vehicle starts moving, and traffic congestion, or the like, can occur. Therefore, there is a high possibility that a stop time becomes relatively long. In this respect, according to the aspect of the disclosure, the automatic stop restricting function is deactivated when a preceding vehicle is located in the predetermined area, in other words, an automatic stop of the engine is permitted when the automatic stop condition is satisfied. Therefore, it is possible to ensure an opportunity to improve fuel efficiency.

Incidentally, even in the predetermined area, the frequency of stop of a vehicle can vary depending on whether the vehicle is close to or far from a temporary stop point. For example, when a line of vehicles is located in the predetermined area, each vehicle is driven to start and stop in accordance with a start and stop of a preceding vehicle. Therefore, the frequency of stop of a vehicle in a rear side of the predetermined area where the number of preceding vehicles counted from the temporary stop point is large tends to be higher than the frequency of stop of a vehicle in a front side of the predetermined area where the number of preceding vehicles is small. If a cycle of vehicle stop, brief automatic engine stop, engine restart and slowness of vehicle start is repeated in the rear side of the predetermined area where the frequency of stop is high, a driver may feel burdensome.

Further another aspect of the disclosure provides a control system for a vehicle. The control system includes an electronic control unit configured as described below. The electronic control unit is configured to (i) have an automatic stop-restart function that automatically stops an engine when a predetermined automatic stop condition is satisfied and that restarts the engine when a predetermined restart condition is satisfied during an automatic engine stop; (ii) have an automatic stop restricting function that, when the host vehicle is located in a predetermined area before a temporary stop point, prolongs a predetermined time period from when the automatic stop condition is satisfied to when the engine is automatically stopped; and (iii) extend the predetermined time period when the host vehicle is located a first predetermined distance or longer away from the temporary stop point in the predetermined area.

With the thus configured control system, it is possible to improve fuel efficiency with the use of the automatic stop-restart function and also possible to reduce deterioration in fuel efficiency due to a brief automatic engine stop and prevent slowness at the time of vehicle start due to a delay in engine startup with the use of the automatic stop restricting function.

In addition, when the host vehicle is located the first predetermined distance or longer away from the temporary stop point in the predetermined area, in other words, when the host vehicle is located in an area in which the frequency of stop is relatively high, the predetermined time period from when the automatic stop condition is satisfied to when the engine is automatically stopped is extended. Therefore, the engine becomes relatively difficult to automatically stop. As a result, it is possible to reduce a feeling of burden on a driver.

Furthermore, when the automatic stop condition remains satisfied even after a lapse of the extended predetermined time period from when the automatic stop condition is satisfied, in other words, when there is a high possibility of occurrence of traffic congestion, or the like, an automatic stop of the engine is permitted. Therefore, in a situation in which a stop time is long, it is possible to further reliably ensure an opportunity to improve fuel efficiency.

In the control system, the first predetermined distance may be a length of the host vehicle.

With the thus configured control system, when the host vehicle is located the length of the host vehicle or longer away from the temporary stop point in the predetermined area, in other words, when the host vehicle is not a lead vehicle, as in the case of the above configuration, it is possible to reduce a feeling of burden on a driver, and it is possible to ensure an opportunity to improve fuel efficiency.

On the other hand, when the host vehicle is located less than the length of the host vehicle from the temporary stop point in the predetermined area, in other words, when the host vehicle is a lead vehicle, the automatic stop restricting function prolongs the predetermined time period in an automatic stop of the engine. Therefore, at the time when the host vehicle has once stopped at the temporary stop point, it is possible to reduce deterioration in fuel efficiency due to a brief automatic engine stop and prevent slowness at the time of vehicle start due to a delay in engine startup.

Furthermore, in the control system, the electronic control unit may be configured to have an automatic restart control function that, during an automatic engine stop in a state where a preceding vehicle is located in the predetermined area, when a start of the preceding vehicle has been detected, restarts the engine even when the restart condition is not satisfied.

With the thus configured control system, it is possible to restart the automatically stopped engine at appropriate timing to follow the preceding vehicle, and it is possible to notify a driver of a start of the preceding vehicle by restarting the engine.

In the control system, the temporary stop point may be at least one of a point of frequent traffic accidents, a point of a temporary stop sign, a railroad crossing, and a point at which a road marking including a stop line is painted.

With the thus configured control system, it is possible to reduce deterioration in fuel efficiency due to a brief automatic engine stop and prevent slowness at the time of vehicle start due to a delay in engine startup at a legal temporary stop point, such as a point of a temporary stop sign or stop line, or a practical temporary stop point (measures for safety), such as a point of frequent traffic accidents, and it is possible to ensure an opportunity to improve fuel efficiency by restricting unnecessary prohibition, or the like, of an automatic engine stop.

Incidentally, in the aspects of the disclosure, when the host vehicle is located in the predetermined area before the temporary stop point, an automatic stop of the engine is restricted as a rule; however, even when the host vehicle has passed by the temporary stop point, it is not always appropriate to immediately permit an automatic stop of the engine when the automatic stop condition is satisfied. For example, when the function of informing a driver of an approach to the temporary stop point is provided, and when an automatic stop of the engine is permitted although a notification is maintained, a driver experiences a feeling of strangeness or, for example, a temporarily stop situation occurs again just after passing by a temporary stop point. As for up to when (up to where) the automatic stop restricting function is maintained active, the following embodiment is illustrated.

Initially, as one embodiment, in the control system, the electronic control unit may be configured to (i) have a notification function that informs a driver of a fact that the host vehicle is located in the predetermined area; and (ii)

maintain continue the automatic stop restricting function active until notification output made by the notification function turns off.

With the thus configured control system, it is possible to call attention to an approach to the temporary stop point by informing the driver of the fact that the host vehicle is located in the predetermined area, and it is possible to adjust the on (start) and off (stop) timing of notification output with the use of the notification function with the activation and deactivation timing of the automatic stop restricting function. Thus, it is possible to reduce a feeling of strangeness that is experienced by the driver.

In another embodiment, in the control system, the electronic control unit may be configured to (i) have a notification function that informs a driver of a fact that the host vehicle is located in the predetermined area; and (ii) maintain the automatic stop restricting function active until notification output made by the notification function turns off and the host vehicle passes by the temporary stop point.

With the thus configured control system, for example, even when notification output turns on as a result of detection of a temporary stop sign but the temporary stop sign and a stop line deviate from each other, in other words, even when the range in which the notification function is activated and the range in which the automatic stop restricting function is activated deviate from each other, it is possible to deactivate the automatic stop restricting function in an appropriate area.

Furthermore, in another embodiment, in the control system, the electronic control unit may be configured to: (i) have a notification function that informs a driver of a fact that the host vehicle is located in the predetermined area; (ii) after notification output made by the notification function turns off, extend the predetermined time period; and (iii) maintain the automatic stop restricting function active until the extended predetermined time elapses from when the automatic stop condition is satisfied.

With the thus configured control system, even after the vehicle has passed by the temporary stop point, an automatic stop of the engine is restricted (delayed) until the extended predetermined time elapses. Thus, for example, even when the driver conducts a so-called two-stage start, that is, the driver once stops the host vehicle before a stop line (temporary stop point) on a traveling road, drives the vehicle to a point at which an intersecting road that intersects with the traveling road is definitely seen, stops the vehicle again, and causes the vehicle to start moving after confirming the safety on both right and left sides, it is possible to reduce deterioration in fuel efficiency due to a brief automatic engine stop and prevent slowness at the time of vehicle start due to a delay in engine startup.

In another embodiment, in the control system, the electronic control unit may be configured to maintain the automatic stop restricting function active until the host vehicle passes by the temporary stop point and the host vehicle is located a second predetermined distance or longer away from the temporary stop point.

With the thus configured control system, an automatic stop of the engine is restricted (prohibited or delayed) until the vehicle is located the second predetermined distance or longer away from the temporary stop point after the vehicle has passed by the temporary stop point. Therefore, even when the vehicle stops just after passing by the temporary stop point, it is possible to reduce deterioration in fuel efficiency due to a brief automatic engine stop and prevent slowness at the time of vehicle start due to a delay in engine startup. Thus, it is possible to deal with a two-stage start as well.

Incidentally, when the function of informing a driver of an approach to the temporary stop point is provided, it is possible to provide the driver with predictability; however, the notification function can remain active (hereinafter, also referred to as stuck on state) because of an error of a detection line, a communication line, or the like, even after the vehicle has passed by the temporary stop. When such a stuck on state occurs, an automatic stop of the engine may be restricted although there is no temporary stop point.

In the control system, when the vehicle has the notification function, the electronic control unit may be configured to, when the host vehicle has travelled a third predetermined distance or longer in a state where the notification function is active, prohibit the automatic stop restricting function.

With the thus configured control system, when the vehicle has travelled the third predetermined distance or longer in a state where the notification function is active, the automatic stop restricting function is prohibited. Therefore, it is possible to reliably ensure an opportunity to improve fuel efficiency by reducing restrictions on an automatic stop of the engine although there is no temporary stop point.

In the aspects of the disclosure, prohibiting the automatic stop restricting function is different from deactivating the automatic stop restricting function for permitting an automatic engine stop when, for example, the condition that a preceding vehicle is located in the predetermined area is satisfied, and means, for example, permitting an automatic engine stop until one trip ends or permitting an automatic engine stop until a stuck on state eliminates.

As described above, with the control system for a vehicle according to the aspects of the disclosure, it is possible to ensure an opportunity to improve fuel efficiency while reducing deterioration in fuel efficiency due to a brief automatic engine stop and preventing slowness at the time of vehicle start.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

Figure 1:
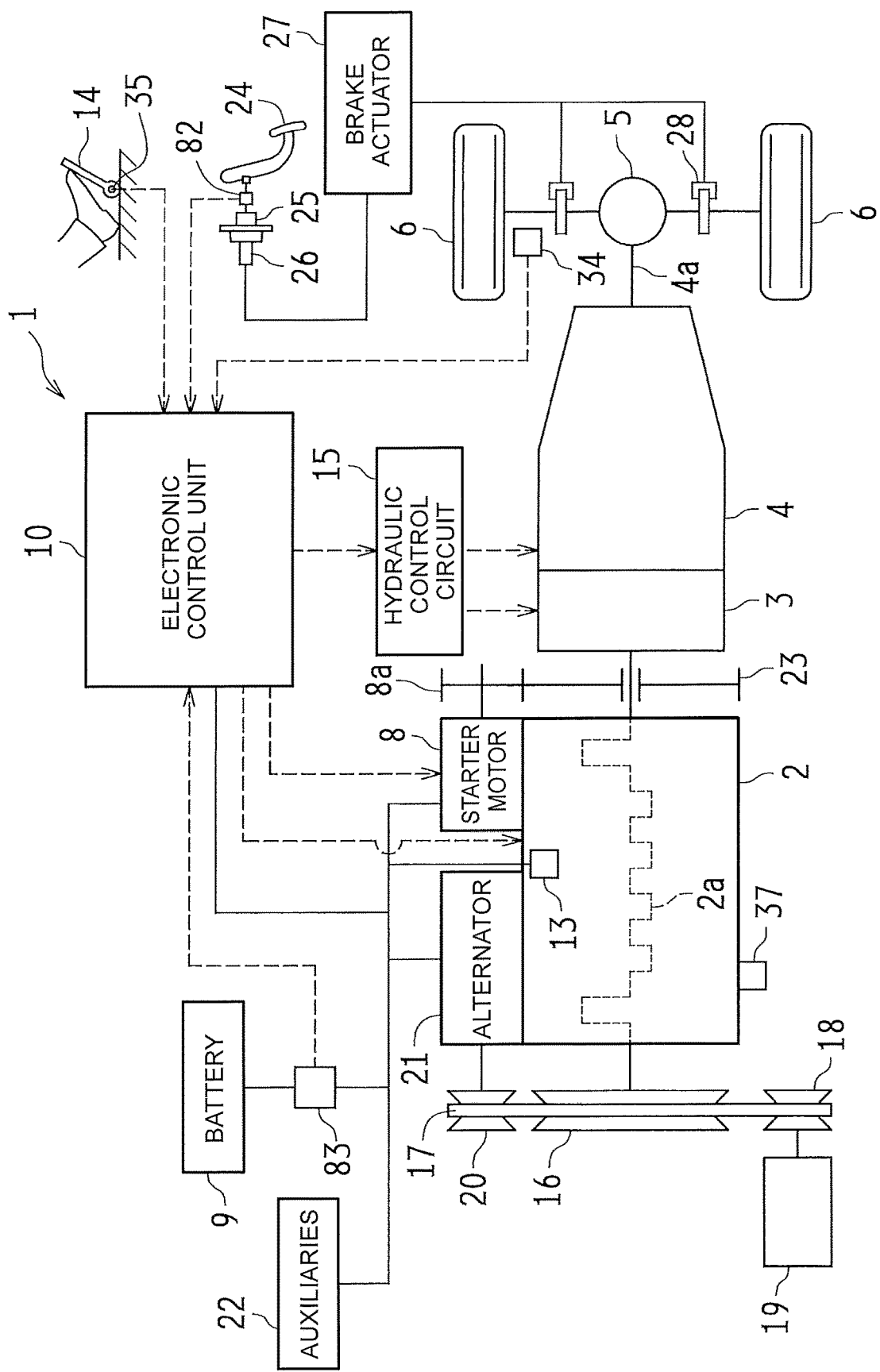
FIG. 1 is a view that shows a relevant portion of a vehicle according to a first embodiment of the disclosure.

Initially, the overall configuration of the first embodiment of the disclosure will be described. FIG. 1 is a view that shows a relevant portion of a vehicle 1 according to the first embodiment. As shown in FIG. 1, the vehicle 1 includes an engine 2, a torque converter 3, an automatic transmission 4, a starter motor 8, a battery 9, and an electronic control unit 10. The torque converter 3 serves as a fluid coupling. The starter motor 8 is used to start the engine 2. The battery 9 supplies electric power to electrical components, such as the starter motor 8 and an ignitor 13.

In the vehicle 1, driving force (torque) output from a crankshaft 2a of the engine 2 that serves as a drive source is transmitted to the automatic transmission 4 via the torque converter 3, the driving force is shifted in speed by the automatic transmission 4 at an appropriate speed ratio and output from an output shaft 4a, and is then finally transmitted to right and left drive wheels 6 via a differential gear unit 5. The electronic control unit 10 executes control over the engine 2, shift control over the automatic transmission 4, and the like. The electronic control unit 10 also executes automatic stop-restart control. In the automatic stop-restart control, the engine 2 is automatically stopped when a predetermined automatic stop condition is satisfied, and the engine 2 is restarted when a predetermined restart condition is satisfied during an automatic engine stop. That is, the vehicle 1 of the first embodiment has an automatic stop-restart function including both the function of automatically stopping the engine 2 (hereinafter, also referred to as idle stop function) and the function of automatically restarting the automatically stopped engine 2.

The engine 2 is a gasoline engine including an electronically controlled throttle valve 11 (see FIG. 2), an injector 12 (see FIG. 2), the ignitor 13, and the like. The throttle valve 11 is used to control an intake air amount. The injector 12 is used to control the supply and supply timing of fuel. The ignitor 13 is used to control ignition timing. The throttle valve 11, the injector 12 and the ignitor 13 are basically controlled by the electronic control unit 10 in response to an operation amount of an accelerator pedal 14 operated by a driver.

The torque converter 3 includes a pump impeller (not shown), a turbine runner (not shown), a stator (not shown), and a lockup clutch (not shown). The pump impeller is coupled to the crankshaft 2a. The turbine runner is coupled to the automatic transmission 4. The stator has a torque amplification function. The lockup clutch is used to directly couple the engine 2 to the automatic transmission 4. The pump impeller and the turbine runner are configured to transmit driving force via fluid; however, for example, during high-speed traveling, the pump impeller and the turbine runner are directly coupled to each other by the lockup clutch, with the result that the efficiency of transmitting driving force from the engine 2 to the automatic transmission 4 increases.

The automatic transmission 4 is a planetary gear stepped transmission that establishes a plurality of gear stages having different gear ratios depending on engaged and released states of clutches and brakes. More specifically, the automatic transmission 4 is configured to establish a plurality of forward gear stages and a reverse gear stage in response to the engaged and released states of these clutches and brakes by selectively engaging or releasing the clutches and brakes in response to hydraulic pressures that are supplied from a hydraulic control circuit 15.

Far from such a driving force transmission line from the engine 2 to the drive wheels 6, driving force output from the engine 2 is transmitted to a belt 17 via a pulley 16 connected to the crankshaft 2a. A pulley 18 coupled to a compressor 19 and a pulley 20 coupled to an alternator 21 are rotated by the driving force transmitted to the belt 17. That is, as the crankshaft 2a rotates, the compressor 19 for air conditioning and the alternator 21 for power generation are driven by driving force that is output from the engine 2.

The alternator 21 is actuated by the driving force of the engine 2, and is configured to be able to generate electric power. Electric power generated by the alternator 21 is supplied to, for example, the starter motor 8, the ignitor 13, auxiliaries 22 (all the electronic components), and the like. Alternatively, electric power generated by the alternator 21 is converted into direct current by a rectifier (not shown), and is charged into the battery 9.

As the starter motor 8 is supplied with electric power from the battery 9, a pinion gear 8a provided on the output shaft of the starter motor 8 rotates. As the pinion gear 8a meshes with a ring gear provided on the outer periphery of a flywheel 23, the engine 2 is started. The starter motor 8 cranks the engine 2 not only at the time of cold start or at the time of engine start resulting from a driver's ignition key operation but also, for example, at the time of engine restart after an automatic engine stop in the automatic stop-restart control.

The battery 9 is a secondary battery or a capacitor. Examples of the secondary battery include a lithium ion battery, a nickel-metal hydride battery, and a lead storage battery. Electric power is supplied from the battery 9 to not only the starter motor 8 and the ignitor 13 but also meters, the electronic control unit 10 and the auxiliaries 22.

In the vehicle 1, braking force is applied to the drive wheels 6 in response to an operation of a brake pedal 24. More specifically, an operational force on the brake pedal 24 is amplified by a brake booster 25 in response to depression of the brake pedal 24, and the amplified operational force is converted by a master cylinder 26 to a hydraulic pressure for generating the braking force of the vehicle 1. The hydraulic pressure from the master cylinder 26 is controlled by a brake actuator 27, and is transmitted to a wheel cylinder 28 that serves as a hydraulic braking unit provided in each drive wheel 6. Thus, braking force is applied to each drive wheel 6.

Figure 2:
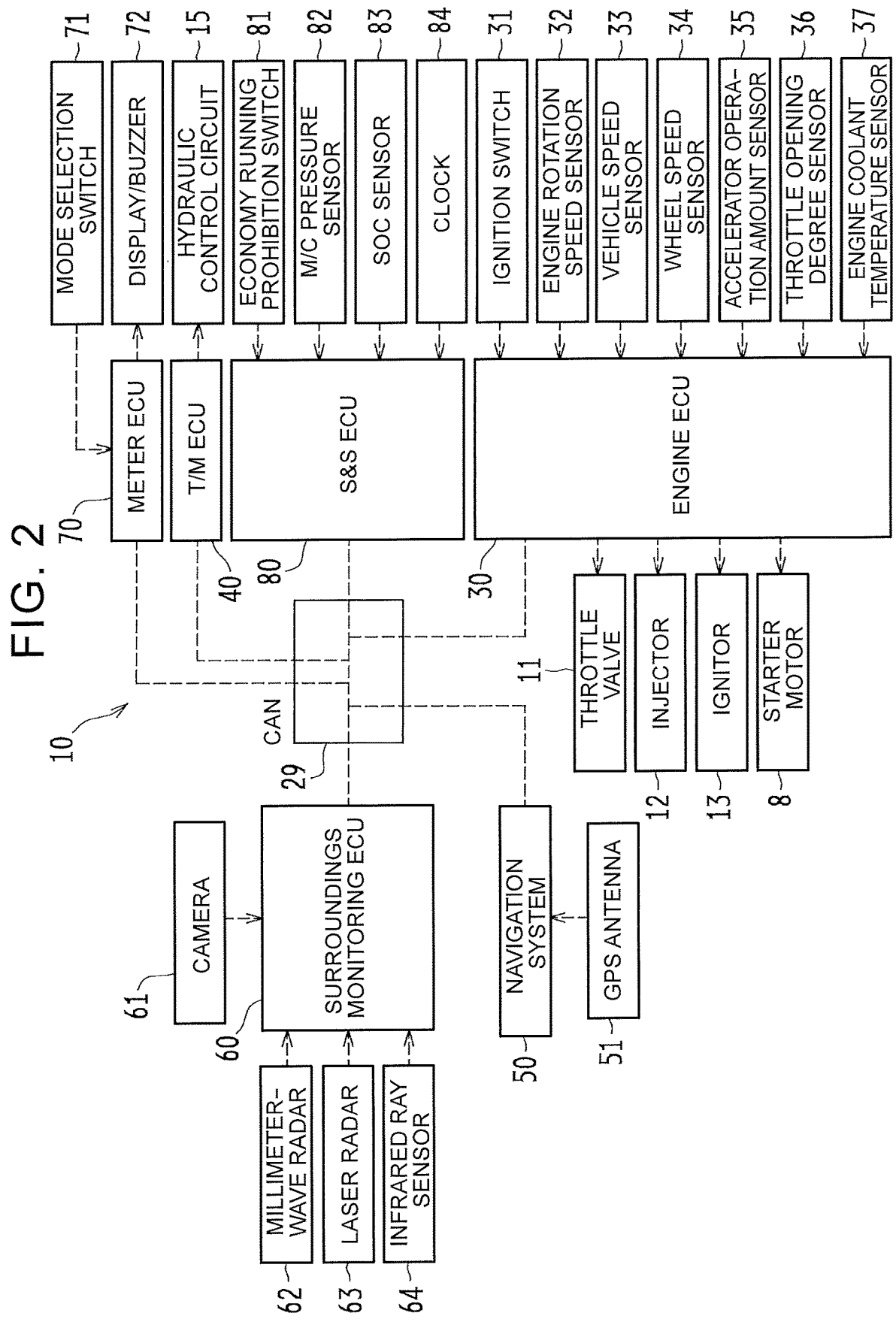
FIG. 2 is a block diagram that schematically shows a control system shown in FIG. 1.

Next, the electronic control unit of the first embodiment will be described. FIG. 2 is a block diagram that schematically shows the electronic control unit 10. The electronic control unit 10 of the present embodiment includes an engine ECU 30, a T/M ECU 40, a navigation system 50, a surroundings monitoring ECU 60, a meter ECU 70, and an S&S ECU 80. Each electronic control unit (ECU) includes a so-called microcomputer including, for example, a central processing unit (CPU), a read only memory (ROM), a random access memory (RAM), a backup RAM, an input/output interface, and the like. The ROM prestores programs that the CPU executes, maps, and the like. The CPU temporarily stores data in the RAM where necessary. The backup RAM holds data even while power is shut off. The CPU executes various controls by executing signal processing in accordance with the programs prestored in the ROM while utilizing a temporary storage function of the RAM. These engine ECU 30, T/M ECU 40, navigation system 50, surroundings monitoring ECU 60, meter ECU 70 and S&S ECU 80 are connected to one another via a controller area network (CAN) 29, and are able to exchange information with one another.

For example, a signal indicating a position of an ignition switch 31, a signal indicating an engine rotation speed, a signal indicating a rotation speed of the output shaft 4a of the automatic transmission 4, a signal indicating a rotation speed of one of the drive wheels 6, a signal indicating an accelerator operation amount, a signal indicating an opening degree of the throttle valve 11, a signal indicating a temperature of engine coolant (engine coolant temperature), and the like, are input to the engine ECU 30. The ignition switch 31 is set in a start position as a result of an operation of the ignition key (not shown). The engine rotation speed is detected by an engine rotation speed sensor 32. The rotation speed of the output shaft 4a of the automatic transmission 4 corresponds to a vehicle speed V that is detected by a vehicle speed sensor 33. The rotation speed of the one of the drive wheels 6 is detected by a wheel speed sensor 34. The accelerator operation amount is detected by an accelerator operation amount sensor 35. The opening degree of the throttle valve 11 is detected by a throttle opening degree sensor 36. The engine coolant temperature is detected by an engine coolant temperature sensor 37.

On the other hand, for example, an engine output control command signal for output control over the engine 2, a drive control signal to the starter motor 8, and the like, are output from the engine ECU 30 based on input signals from these various sensors. Examples of the engine output control command signal include a throttle signal for controlling the opening and closing of the throttle valve 11, a signal for controlling an injection amount and injection timing of fuel that is injected from the injector 12, and a signal for controlling the ignition timing of an ignition plug (not shown) with the ignitor 13. Through these signals, the engine ECU 30 executes output control over the engine 2, drive control over the starter motor 8, and the like.

The T/M ECU 40 executes shift control over the automatic transmission 4 by outputting a hydraulic control command signal for controlling the hydraulic control circuit 15 related to a shift of the automatic transmission 4.

The navigation system 50 receives via a GPS antenna 51 signals transmitted from a plurality of GPS satellites. As the navigation system 50 receives signals from the GPS satellites and identifies a current location of the vehicle 1, the navigation system 50 is configured to output current location information of the vehicle 1 to the surroundings monitoring ECU 60, and the like. The current location information of the vehicle 1 includes whether there is a temporary stop sign 90 (see FIG. 3), whether there is a railroad crossing and whether there is a road marking including a stop line 91 (see FIG. 3). The navigation system 50 is also configured to output, to the surroundings monitoring ECU 60, and the like, information as to whether the current location of the vehicle 1 is close to a point of frequent traffic accidents.

Image data from a camera 61, detected signals from a millimeter-wave radar 62, a laser radar 63 and an infrared ray sensor 64, and the like, are input to the surroundings monitoring ECU 60. The camera 61 captures a situation around the vehicle 1. The millimeter-wave radar 62 utilizes electric waves that are usable in foggy or rainy weather. The laser radar 63 measures a distance, direction, and the like, of an object based on reflected light. The infrared ray sensor 64 receives infrared rays and extracts required information. The surroundings monitoring ECU 60 is configured to determine whether there is a preceding vehicle 100 (see FIG. 6), whether there is a temporary stop sign 90 or a stop line 91 ahead of the vehicle 1, and the like, based on these input signals, and output the determined results to the meter ECU 70 and the S&S ECU 80.

An on/off signal of a mode selection switch 71 is input to the meter ECU 70. The mode selection switch 71 is operated by the driver, and is provided on, for example, an instrument panel (not shown). When a temporary stop sign notification mode is selected (when the mode selection switch 71 is in the on state), the meter ECU 70 is configured to inform the driver via a display/buzzer 72 of an approach to a temporary stop point at the time when the vehicle 1 has approached to the temporary stop sign 90. On the other hand, when the temporary stop sign notification mode is not selected (when the mode selection switch 71 is in the off state), the meter ECU 70 is configured to not inform the driver of an approach to a temporary stop point even when the vehicle 1 has approached to the temporary stop sign 90.

An on/off signal from an economy running prohibition switch 81, a signal indicating an on/off state of the brake, a signal indicating a state of charge (hereinafter, also referred to as SOC) of the battery 9, various time signals that are measured by a clock 84, and the like, are input to the stop and start (S&S) ECU 80. The economy running prohibition switch 81 indicates whether the driver is prohibiting execution of the automatic stop-restart control. The on/off state of the brake is based on a brake master cylinder pressure from an M/C pressure sensor 82 or a detected result of the M/C pressure sensor 82. The M/C pressure sensor 82 detects a brake master cylinder pressure of the master cylinder 26. The brake master cylinder pressure is generated in response to a depression force of the brake pedal 24. The SOC of the battery 9 is detected by an SOC sensor 83.

When the S&S ECU 80 determines that the automatic stop condition is satisfied based on input signals from these various sensors and the other ECUs, the S&S ECU 80 transmits an engine stop command to the engine ECU 30 to cause the engine ECU 30 to execute fuel cut control for stopping supply of fuel to a combustion chamber of the engine 2. On the other hand, when the S&S ECU 80 determines that the restart condition is satisfied during an automatic engine stop, the S&S ECU 80 transmits an engine restart command to the engine ECU 30 to cause the engine ECU 30 to start supply of fuel to the combustion chamber of the engine 2 and restart the engine 2 with the use of the starter motor 8.

Examples of the predetermined automatic stop condition include (1) a condition that the economy running prohibition switch 81 is in the off state, (2) a condition that the accelerator pedal 14 is not depressed (detected by the accelerator operation amount sensor 35), (3) a condition that the brake is in the on state (detected by the M/C pressure sensor 82), (4) a condition that the vehicle 1 is stopped (the vehicle speed V is zero km/h) (detected by the wheel speed sensor 34), (5) a condition that the SOC is higher than or equal to a predetermined state of charge (detected by the SOC sensor 83), and (6) a condition that the engine coolant temperature is higher than or equal to a predetermined coolant temperature (detected by the engine coolant temperature sensor 37). When all these conditions (1) to (6) are satisfied, the S&S ECU 80 determines that the automatic stop condition is satisfied.

On the other hand, examples of the restart condition include a condition that the brake pedal 24 is not depressed (or the accelerator pedal 14 is depressed or both). When this condition is satisfied during an automatic engine stop, the S&S ECU 80 determines that the restart condition is satisfied.

Next, the automatic stop-restart control that is executed when the vehicle 1 is located near a temporary stop point will be described. Initially, an automatic stop restricting function will be described. As described above, the vehicle 1 according to the first embodiment has an idle stop function that automatically stops the engine 2 when the predetermined automatic stop condition is satisfied. The vehicle 1 is able to improve fuel efficiency by executing fuel-cut control with the use of the idle stop function. In the fuel-cut control, supply of fuel to the combustion chamber of the engine 2 is stopped.

Of course, the idle stop function is intended to be activated in a situation in which the vehicle 1 remains stopped for several seconds to several tens of seconds, such as waiting at a traffic light and waiting at a railroad crossing; however, the idle stop function can be activated also in a situation in which the vehicle 1 starts moving just after making a stop for confirming the safety at a temporary stop point, such as a point before the stop line 91 or a railroad crossing. When the idle stop function is activated in a situation in which the vehicle 1 starts moving just after making a stop, there is a possibility of deterioration in fuel efficiency due to a brief automatic engine stop conversely or a possibility of slowness at the time of vehicle start due to a delay in startup at an engine restart.

In the first embodiment, the electronic control unit 10 is configured to, when the host vehicle 1 is located in a predetermined area before a temporary stop point, prohibit an automatic stop of the engine 2.

Examples of the temporary stop point include a legal temporary stop point and a practical temporary stop point (for measures for safety). The legal temporary stop point includes a point at which the temporary stop sign 90 is located, a railroad crossing, and a road marking including the stop line 91 is painted. The practical temporary stop point (measures for safety) includes a point of frequent traffic accidents.

Figure 3:
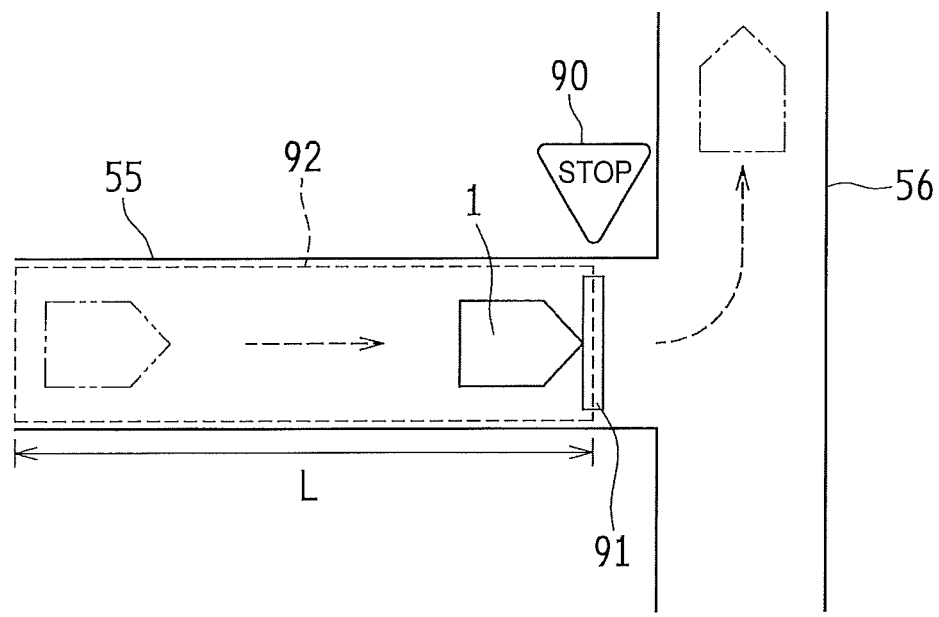
FIG. 3 is a view that schematically shows an example of a predetermined area that is an area before a temporary stop point, that is, a point at which the vehicle should temporarily stop.

Examples of the predetermined area before the temporary stop point include a first predetermined area 92 located before the temporary stop sign 90 (or the stop line 91), in other words, a range of a distance L (m) before the stop line 91 on a host vehicle traveling road 55, as shown in FIG. 3.

In the electronic control unit 10 of the first embodiment, when the surroundings monitoring ECU 60 detects, for example, the temporary stop sign 90 ahead of the vehicle 1 based on, for example, image data from the camera 61 or current location information of the vehicle 1 from the navigation system 50, the surroundings monitoring ECU 60 is configured to measure a distance X between the temporary stop sign 90 and a front end of the host vehicle 1 with the use of the millimeter-wave radar 62, or the like, determine whether the host vehicle 1 is located in the first predetermined area 92 (Distance X≤Distance L), and transmit the determined result to the meter ECU 70 and the S&S ECU 80.

The meter ECU 70 has a temporary stop sign notification function (notification function) that informs the driver of an approach to a temporary stop point with, for example, a buzzer (sound) or a display provided in the instrument panel (screen display), as described above. The temporary stop sign notification function is configured to be activated only when the driver turns on the mode selection switch 71 to select the temporary stop sign notification mode. When the surroundings monitoring ECU 60 determines that the host vehicle 1 is located in the first predetermined area 92 in the temporary stop sign notification mode selected through driver's turning on operation, the meter ECU 70 is configured to inform the driver of an approach to a temporary stop point via the display/buzzer 72 (turn on temporary stop notification output) with the use of the temporary stop sign notification function.

On the other hand, the S&S ECU 80 has the automatic stop restricting function that prohibits an automatic stop of the engine 2 when the surroundings monitoring ECU 60 determines that the host vehicle 1 is located in the first predetermined area 92. That is, the S&S ECU 80 is configured to, when the host vehicle 1 is located in the first predetermined area 92, in other words, when the vehicle 1 tends to start moving just after making a stop, prohibit an automatic stop of the engine 2 with the use of the automatic stop restricting function.

In this way, in the first embodiment, when the S&S ECU 80 prohibits an automatic stop of the engine 2 in synchronization with the timing at which the meter ECU 70 informs the driver of an approach to a temporary stop point, it is possible to call driver's attention, and it is also possible to reduce deterioration in fuel efficiency due to a brief automatic engine stop and prevent slowness at the time of vehicle start due to a delay in startup at an engine restart. Thus, it is possible to reduce occurrence of traffic congestion before the temporary stop sign 90.

Figure 4:
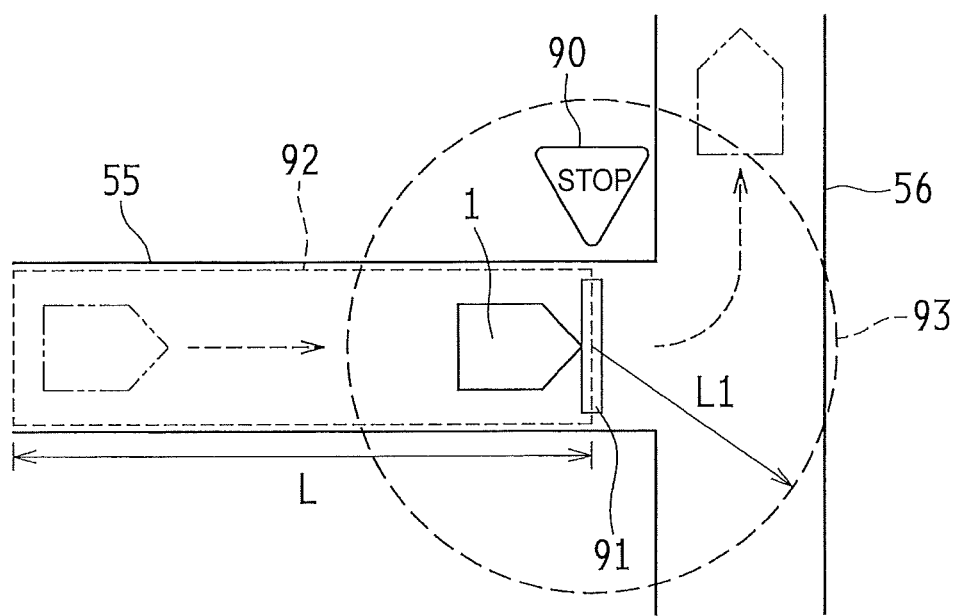
FIG. 4 is a view that schematically shows an example of a range in which an automatic stop restricting function of the vehicle is activated.

In the first embodiment, the automatic stop restricting function is maintained active also in a second predetermined area 93 beyond the temporary stop sign 90 (or the stop line 91) in addition to the first predetermined area 92. A range in which the automatic stop restricting function is activated is, for example, set to a range (first predetermined area 92) of a distance L (m) before the stop line 91 and a range (second predetermined area 93) of a radius L1 (m) with the center set to the stop line 91, as shown in FIG. 4. In relation with the appended claims, L1 corresponds to a second predetermined distance.

In this way, since an automatic stop of the engine 2 is prohibited not only in the first predetermined area 92 but also in the second predetermined area 93, for example, even when the driver conducts a so-called two-stage start, that is, the host vehicle 1 once stops before the stop line 91 on the host vehicle traveling road 55, then the host vehicle 1 is driven to a point at which an intersecting road 56 that intersects with the host vehicle traveling road 55 can be definitely seen and is stopped again, and the vehicle 1 is caused to start moving after confirming the safety on both right and left sides, it is possible to reduce deterioration in fuel efficiency due to a brief automatic engine stop and prevent slowness at the time of vehicle start due to a delay in engine startup.

In addition, in the first embodiment, the surroundings monitoring ECU 60 is configured to determine whether the vehicle 1 has passed by the temporary stop sign 90 or the stop line 91 based on, for example, image data from the camera 61, a detected signal from the millimeter-wave radar 62, or the like, or current location information of the vehicle 1 from the navigation system 50, and transmit the determined result to the meter ECU 70. The surroundings monitoring ECU 60 is also configured to determine whether the host vehicle 1 has come out of the second predetermined area 93, and transmit the determined result to the S&S ECU 80.

The meter ECU 70 is configured to, when the surroundings monitoring ECU 60 determines that the host vehicle 1 has passed by the temporary stop sign 90, stop the buzzer or the display (turn off temporary stop notification output). On the other hand, the S&S ECU 80 is configured to, when the surroundings monitoring ECU 60 determines that the host vehicle 1 has come out of the second predetermined area 93, deactivate the automatic stop restricting function that prohibits an automatic stop of the engine 2. Thus, after the vehicle 1 passes through the area in which the vehicle 1 tends to start moving just after making a stop (first predetermined area 92) and the area in which the vehicle 1 repeats a brief stop and a start for two-stage start (second predetermined area 93), the automatic stop-restart function returns to a ready state. Therefore, fuel efficiency improves.

Figure 5:
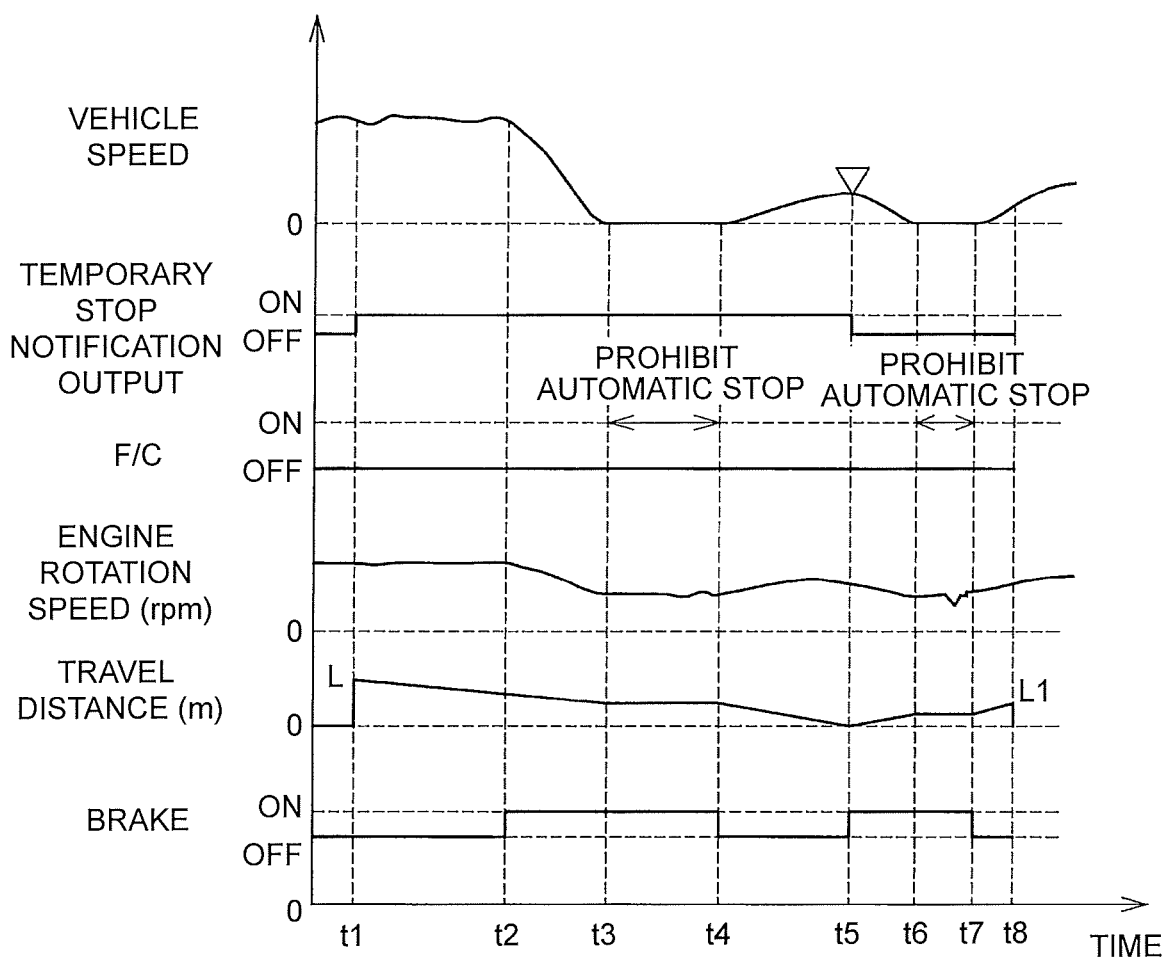
FIG. 5 is a timing chart that schematically shows an example in the case where the automatic stop restricting function is active.

FIG. 5 is a timing chart that schematically shows an example in the case where the automatic stop restricting function is active. The inverted triangle mark in FIG. 5 indicates the location of the temporary stop sign 90 (or the stop line 91). An on state of temporary stop notification output in FIG. 5 indicates a state where the driver is informed via the display/buzzer 72 of an approach to a temporary stop point. F/C denotes fuel-cut control. The travel distance in FIG. 5 indicates a distance from the location (indicated by the inverted triangle mark) of the temporary stop sign 90 (or the stop line 91).

As shown in FIG. 5, as the travel distance becomes L (m) at time t1, in other words, as the host vehicle 1 enters the first predetermined area 92, temporary stop notification output turns on, thus calling driver's attention. As the brake is in the on state in the first predetermined area 92 at time t2, the vehicle speed V and the engine rotation speed begin to decrease.

Even when the vehicle speed V is zero and the brake is in the on state and, as a result, the automatic stop condition is satisfied at time t3, since an automatic stop of the engine 2 is prohibited by the automatic stop restricting function, F/C is not set to an on state. For this reason, even when the brake is set to an off state at time t4, it is possible to reduce deterioration in fuel efficiency due to a brief automatic engine stop and prevent slowness at the time of vehicle start by quickly increasing the vehicle speed V as shown in FIG. 3.

As the travel distance L becomes zero (m) at time t5, temporary stop notification output turns off. Even when the vehicle 1 is driven to a point at which the intersecting road 56 can be definitely seen and the automatic stop condition is satisfied on the condition that the vehicle speed V is zero and the brake is set to the on state again at time t6, since the host vehicle 1 is located in the second predetermined area 93, an automatic stop of the engine 2 is prohibited by the automatic stop restricting function. Therefore, F/C is not set to the on state. For this reason, even when the brake is set to the off state at time t7, it is possible to reduce deterioration in fuel efficiency due to a brief automatic engine stop and prevent slowness at the time of vehicle start by quickly increasing the vehicle speed V. After that, as the travel distance becomes L1 (m) at time t8, the automatic stop restricting function is deactivated, and the automatic stop-restart function returns to a ready state.

Next, deactivation of the automatic stop restricting function will be described. Incidentally, when a preceding vehicle 100 is located in the first predetermined area 92 in which the vehicle 1 tends to start moving just after making a stop, the host vehicle 1 needs to wait to start moving until the preceding vehicle 100 starts moving, and occurrence of traffic congestion is also predicted. Therefore, a stop time tends to be relatively long. In this way, when an automatic stop of the engine 2 is prohibited even when the vehicle 1 is highly likely to remain stopped for a certain time period, an opportunity to improve fuel efficiency can reduce.

Figure 6:
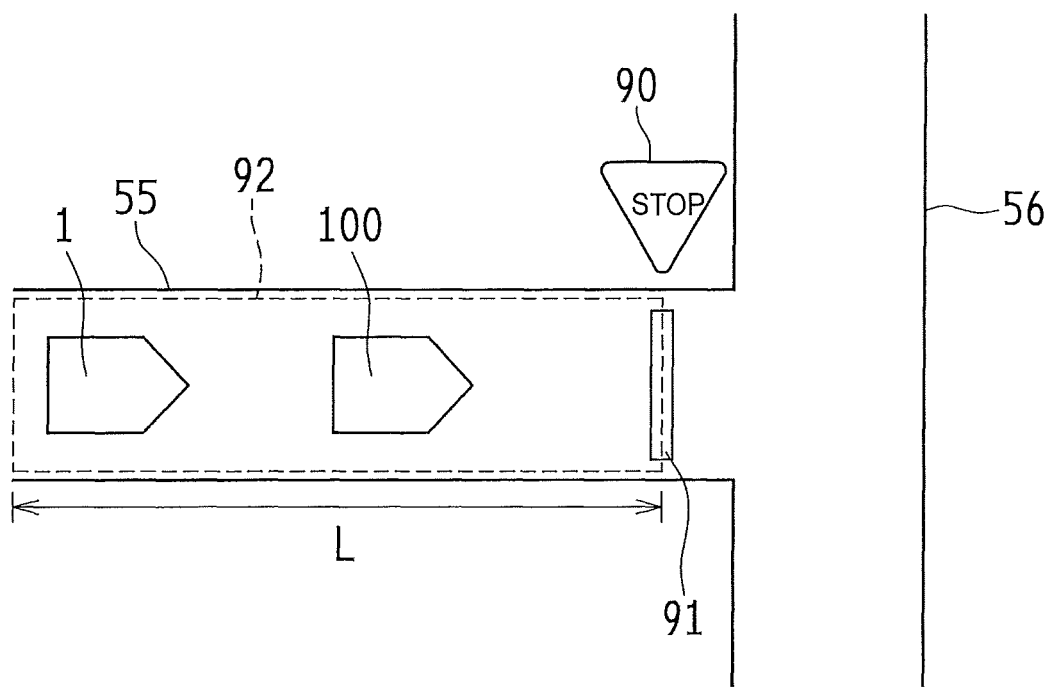
FIG. 6 is a view that schematically shows an example in the case where the automatic stop restricting function is deactivated.

In the first embodiment, as shown in FIG. 6, the electronic control unit 10 is configured to, when a preceding vehicle 100 is located in the first predetermined area 92, deactivate the automatic stop restricting function. Specifically, the surroundings monitoring ECU 60 is configured to determine whether there is a preceding vehicle 100 based on image data from the camera 61, a detected signal from the millimeter-wave radar 62, or the like, or another signal, and transmit the determined result to the S&S ECU 80. The S&S ECU 80 is configured to, when the surroundings monitoring ECU 60 determines that a preceding vehicle 100 is located in the first predetermined area 92, deactivate the automatic stop restricting function, in other words, permit an automatic stop of the engine 2 when the host vehicle 1 stops (when the automatic stop condition is satisfied). In this way, when a preceding vehicle 100 is located in the first predetermined area 92, in other words, when the vehicle 1 is highly likely to remain stopped for a certain time period, an automatic stop of the engine 2 is permitted. Therefore, it is possible to ensure an opportunity to improve fuel efficiency.

That is, in the first embodiment, fuel efficiency is improved by executing automatic stop-restart control as a rule, and an automatic stop of the engine 2 is exceptionally prohibited in the first predetermined area 92 in which the vehicle 1 is highly likely to start moving just after making a stop. On the other hand, in a situation in which the vehicle 1 is highly likely to remain stopped for a certain time period, an automatic stop of the engine 2 is permitted as a rule.

When no preceding vehicle 100 is located in the first predetermined area 92, in other words, when the host vehicle 1 is a lead vehicle in the first predetermined area 92, the automatic stop restricting function returns. For this reason, at the time when the host vehicle 1 once stops before the stop line 91 on the host vehicle traveling road 55 or at the time when the host vehicle 1 is driven to a point at which the intersecting road 56 can be definitely seen and is stopped again, since the S&S ECU 80 prohibits an automatic stop of the engine 2 with the use of the automatic stop restricting function, slowness at the time of vehicle start due to a delay in startup at an engine restart is prevented. Therefore, it is possible to smoothly conduct a two-stage start.

Next, an example of the automatic stop-restart control that is executed by the electronic control unit 10 when the vehicle 1 is located near a temporary stop point will be described with reference to the flowchart shown in FIG. 7.

Initially, in step SA1, the electronic control unit 10 determines whether the temporary stop sign notification mode is set. Specifically, the meter ECU 70 determines whether the temporary stop sign notification mode is selected based on the on/off signal of the mode selection switch 71 that is operated by the driver. When negative determination is made in step SA1, in other words, when the temporary stop sign notification mode is not selected by the driver, the process directly returns. In the first embodiment, when the temporary stop sign notification mode is not selected by the driver, the electronic control unit 10 is configured to not activate the automatic stop restricting function even when the vehicle 1 approaches to a temporary stop point. On the other hand, when affirmative determination is made in step SA1, in other words, when the temporary stop sign notification mode is selected by the driver, the process proceeds to step SA2.

In the next step SA2, the electronic control unit 10 determines whether a temporary stop sign 90 has been detected. Specifically, the surroundings monitoring ECU 60 determines whether a temporary stop sign 90 has been detected ahead of the host vehicle 1 based on, for example, image data from the camera 61 or current location information of the vehicle 1 from the navigation system 50. When negative determination is made in step SA2, in other words, when no temporary stop sign 90 has been detected, the process returns. On the other hand, when affirmative determination is made in step SA2, the process proceeds to step SA3.

In the next step SA3, the electronic control unit 10 determines whether the distance between the host vehicle 1 and the temporary stop sign 90 is shorter than or equal to L (m). Specifically, the surroundings monitoring ECU 60 measures a distance X between the temporary stop sign 90 and, for example, the front end of the host vehicle 1 based on, for example, image data from the camera 61, a detected signal from the millimeter-wave radar 62, or the like, or another signal, and determines whether the host vehicle 1 is located in the first predetermined area 92 (Distance X≤Distance L). When negative determination is made in step SA3, the process returns. On the other hand, when affirmative determination is made in step SA3, in other words, when the host vehicle 1 is located in the first predetermined area 92, the process proceeds to step SA4.

In the next step SA4, the electronic control unit 10 determines whether temporary stop notification output to the driver is in the on state, in other words, whether the driver is actually informed via the display/buzzer 72 of an approach to the temporary stop point. When negative determination is made in step SA4, for example, the process returns when the driver is not actually informed because of a failure of the display/buzzer 72, or the like. In this case, this is a state similar to the state where the temporary stop sign notification mode is not selected by the driver, the electronic control unit 10 is configured to not activate the automatic stop restricting function even at the time of an approach to the temporary stop point. On the other hand, when affirmative determination is made in step SA4, in other words, when the driver is actually informed via the display/buzzer 72 of an approach to the temporary stop point, the process proceeds to step SA5. In the next step SA5, the electronic control unit 10 (S&S ECU 80) activates the automatic stop restricting (prohibiting) function (more accurately, set the automatic stop restricting (prohibiting) function to a ready state), and then the process proceeds to step SA6.

In the next step SA6, the electronic control unit 10 determines whether a preceding vehicle 100 is located in the first predetermined area 92. Specifically, the surroundings monitoring ECU 60 determines whether there is a preceding vehicle 100 based on image data from the camera 61, a detected signal from the millimeter-wave radar 62, or the like, or another signal. When affirmative determination is made in step SA6, in other words, when a preceding vehicle 100 is located in the first predetermined area 92, a stop time period tends to be relatively long, so the process proceeds to step SA12. In step SA12, the S&S ECU 80 deactivates the automatic stop restricting function, and then the process proceeds to step SA13.

In the next step SA13, the electronic control unit 10 determines whether the host vehicle 1 has stopped based on, for example, a signal from the vehicle speed sensor 33 or the wheel speed sensor 34. When negative determination is made in step SA13, the process returns. On the other hand, when affirmative determination is made in step SA13, the process proceeds to step SA14. In step SA14, the S&S ECU 80 causes the engine ECU 30 to execute fuel-cut control and automatically stop the engine 2, after which the process proceeds to step SA15.

In the next step SA15, the electronic control unit 10 (S&S ECU 80) determines whether the restart condition is satisfied based on signals from the accelerator operation amount sensor 35 and the M/C pressure sensor 82. When negative determination is made in step SA15, the process returns. On the other hand, when affirmative determination is made in step SA15, the S&S ECU 80 causes the engine ECU 30 to start supply of fuel to the combustion chamber and restarts the engine 2 with the use of the starter motor 8. After the host vehicle 1 starts moving, the process returns.

In contrast, when negative determination is made in step SA6, that is, for example, when there is no preceding vehicle 100 and the vehicle 1 smoothly moves to the stop line 91 or when the preceding vehicle 100 comes out of the first predetermined area 92 and the host vehicle 1 becomes a lead vehicle, the process proceeds to step SA7. In the next step SA7, the electronic control unit 10 determines whether the host vehicle 1 has stopped based on, for example, a signal from the vehicle speed sensor 33 or the wheel speed sensor 34. When negative determination is made in step SA7, the process returns. On the other hand, when affirmative determination is made in step SA7, the process proceeds to step SA8. In step SA8, the electronic control unit 10 (S&S ECU 80) prohibits an automatic stop of the engine 2 with the use of the automatic stop restricting function, and then the process proceeds to step SA9.

In the next step SA9, the electronic control unit 10 determines whether the host vehicle 1 has started moving based on, for example, a signal from the wheel speed sensor 34. When negative determination is made in step SA9, the process returns. On the other hand, when affirmative determination is made in step SA9, the process proceeds to step SA10.

In the next step SA10, the electronic control unit 10 determines whether the temporary stop notification output has changed from the on state to the off state and whether the distance from the temporary stop sign 90 (or the stop line 91) is longer than or equal to L1 (m). When the surroundings monitoring ECU 60 determines that the host vehicle 1 has passed by the temporary stop sign 90, the meter ECU 70 turns off the temporary stop notification output. Therefore, whether the temporary stop notification output has changed from the on state to the off state translates to whether the host vehicle 1 has passed by the temporary stop sign 90. That is, in step SA10, the surroundings monitoring ECU 60 determines whether the host vehicle 1 has come out of the second predetermined area 93 based on, for example, image data from the camera 61. When negative determination is made in step SA10, the host vehicle 1 has not come out of the first predetermined area 92 or the second predetermined area 93 yet, so the process returns. On the other hand, when affirmative determination is made in step SA10, in other words, when the vehicle 1 has come out of a situation in which the vehicle 1 starts moving just after making a stop, the process proceeds to step SA11. In step SA11, the S&S ECU 80 permits an automatic stop of the engine 2 (permits the engine 2 to automatically stop when the automatic stop condition is satisfied), and then the process returns.

As described above, according to the first embodiment, when the predetermined automatic stop condition is satisfied, the engine 2 is automatically stopped by executing fuel cut, or the like, with the use of the automatic stop-restart function. Therefore, it is possible to improve fuel efficiency. In addition, when the host vehicle 1 is located in the first predetermined area 92, in other words, when the vehicle 1 tends to start moving just after making a stop, the electronic control unit 10 prohibits an automatic stop of the engine 2 with the use of the automatic stop restricting function. Therefore, at the time when the vehicle 1 has stopped at the stop line 91, or the like, it is possible to reduce deterioration in fuel efficiency due to a brief automatic engine stop and prevent slowness at the time of vehicle start due to a delay in engine startup. Furthermore, when a preceding vehicle 100 is located in the first predetermined area 92, the automatic stop restricting function is deactivated, so it is possible to ensure an opportunity to improve fuel efficiency.

Next, a first alternative embodiment to the first embodiment will be described. In the first embodiment, the meter ECU 70 has the temporary stop sign notification function that informs the driver of an approach to a temporary stop point; however, the disclosure is not limited to this configuration. The meter ECU 70 does not need to have the temporary stop sign notification function.

Figure 7:
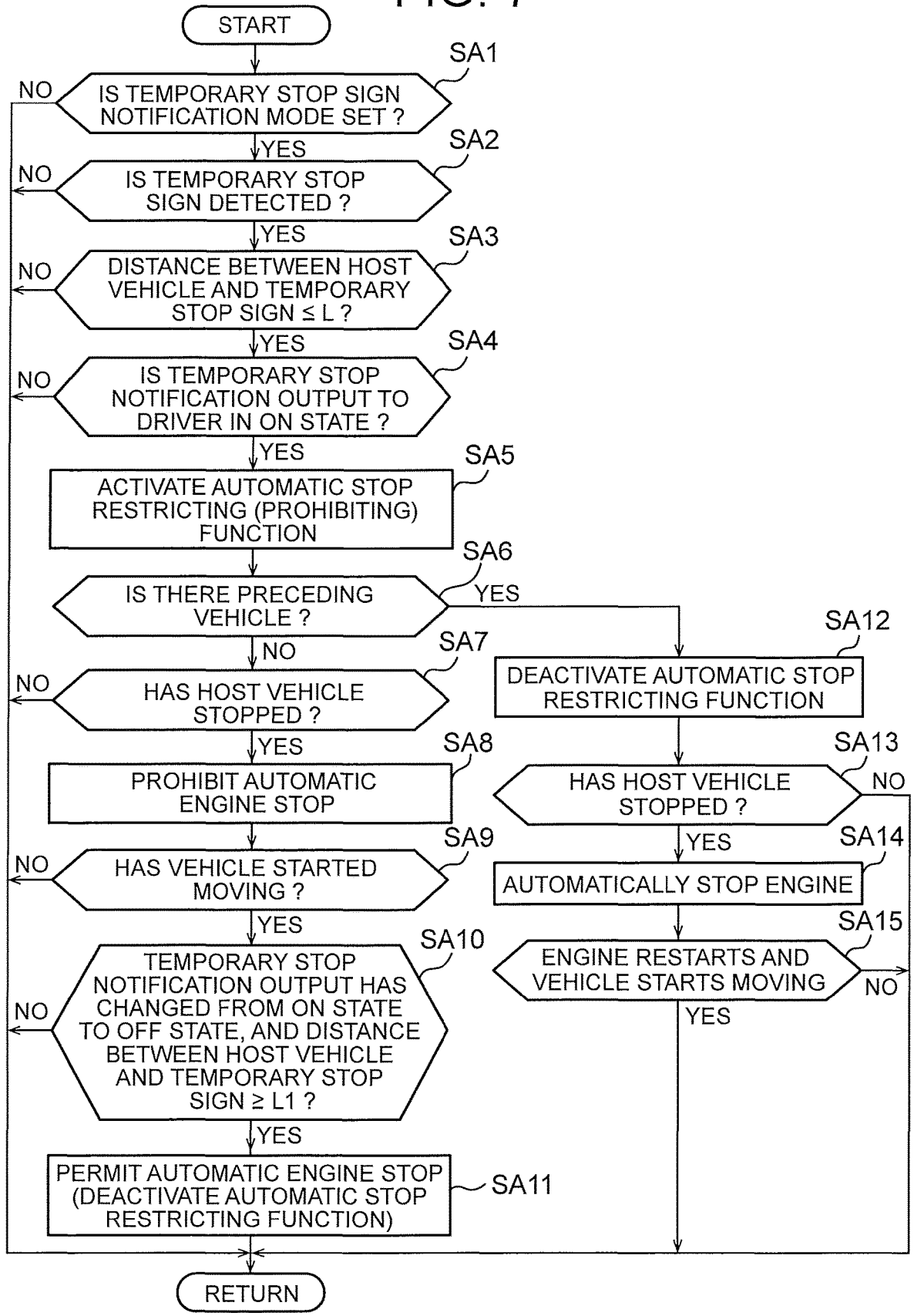
FIG. 7 is a flowchart that shows an example of automatic stop-restart control near a temporary stop point, that is, a point at which the vehicle should temporarily stop.

In the case of the first alternative embodiment, as shown by the flowchart in FIG. 7, by just omitting step SA1 and step SA4, an automatic stop of the engine 2 is prohibited with the use of the automatic stop restricting function without informing the driver of an approach to a temporary stop point, and the automatic stop restricting function is deactivated when a preceding vehicle 100 is located in the first predetermined area 92.

Next, a second alternative embodiment to the first embodiment will be described. In the first embodiment, when the host vehicle 1 is located in the first predetermined area 92, an automatic stop of the engine 2 is prohibited; however, the disclosure is not limited to this configuration. The electronic control unit 10 may have an automatic stop restricting function that, when the host vehicle 1 is located in the first predetermined area 92, prolongs a predetermined time period from when the automatic stop condition is satisfied to when the engine 2 is automatically stopped.

With such a configuration of the second alternative embodiment, even when the host vehicle 1 stops in the first predetermined area 92, the engine 2 is not automatically stopped in the predetermined time period from when the automatic stop condition is satisfied. Therefore, even when the vehicle 1 starts moving just after making a stop, it is possible to reduce deterioration in fuel efficiency due to a brief automatic engine stop. On the other hand, when the vehicle 1 remains stopped because of occurrence of traffic congestion, or the like, after a lapse of the predetermined time period from when the vehicle 1 has stopped, an automatic stop of the engine 2 is permitted. Therefore, it is possible to ensure an opportunity to improve fuel efficiency as compared to when an automatic stop of the engine 2 is prohibited as in the case of the first embodiment.

A third alternative embodiment to the first embodiment will be described. In the first embodiment, as the surroundings monitoring ECU 60 detects a temporary stop sign 90 based on image data from the camera 61, current location information of the vehicle 1 from the navigation system 50, or the like, the automatic stop restricting function is basically activated; however, the disclosure is not limited to this configuration. The automatic stop restricting function may be activated only when a temporary stop sign 90 (or the stop line 91) has been detected by two or more different manners, that is, a temporary stop sign 90 has been detected based on, for example, image data from the camera 61, and the temporary stop sign 90 has been detected based on, for example, current location information of the vehicle 1 from the navigation system 50.

With such a configuration of the third alternative embodiment, it is possible to restrict an automatic stop of the engine 2 only when necessary while reducing erroneous detection of a temporary stop point.

Next, a fourth alternative embodiment to the first embodiment will be described. In the first embodiment, the automatic stop restricting function is activated also in the second predetermined area 93 (within the range of a radius L1 (m) with the center set to the stop line 91); however, the disclosure is not limited to this configuration. The automatic stop restricting function may be activated until the host vehicle 1 merges with traffic on the intersecting road 56.

Specifically, the surroundings monitoring ECU 60 acquires information about an end of a road on which the stop line 91 is provided (host vehicle traveling road 55) and information about the intersecting road 56 that connects to the host vehicle traveling road 55 based on image data from the camera 61, current location information of the vehicle 1 from the navigation system 50, or the like, and causes the S&S ECU 80 to maintain the automatic stop restricting function active until merging of the vehicle 1 from the host vehicle traveling road 55 to the intersecting road 56 is confirmed by image data captured in real time or current location information acquired in real time.

With such a configuration of the fourth alternative embodiment, minute control is executed. In the minute control, an automatic stop of the engine 2 is prohibited not with reference to the range of the radius L1 (m), employed based on, for example, experiment, statistics, or the like, and is prohibited until merging of the vehicle 1 with traffic on the intersecting road 56 is confirmed with the use of image data captured in real time or map information acquired in real time. Therefore, it is possible to reliably prevent slowness at the time of vehicle start at, for example, a point of connection between the host vehicle traveling road 55 and the intersecting road 56. As a result, it is possible to improve drivability in two-stage start.

Next, a fifth alternative embodiment to the first embodiment will be described. In the first embodiment, the automatic stop restricting function is activated also in the second predetermined area 93; however, the disclosure is not limited to this configuration. For example, as long as the vehicle 1 does not need to undergo a two-stage start, the automatic stop restricting function may be deactivated at the time when the temporary stop notification output turns off, in other words, the automatic stop restricting function may be maintained active until the temporary stop notification output turns off.

With such a configuration of the fifth alternative embodiment, it is possible to adjust the on (start) and off (stop) timing of temporary stop notification output with the use of the temporary stop sign notification function to the activation and deactivation timing of the automatic stop restricting function. Thus, it is possible to reduce a feeling of strangeness that is experienced by the driver.

A sixth alternative embodiment to the first embodiment will be described. In the first embodiment, the automatic stop restricting function is activated also in the second predetermined area 93; however, the disclosure is not limited to this configuration. For example, in a situation in which the vehicle 1 does not need to undergo a two-stage start, the automatic stop restricting function may be deactivated at the time when the temporary stop notification output turns off and the vehicle 1 has passed by the stop line 91, in other words, the automatic stop restricting function may be maintained active until the temporary stop notification output turns off and the vehicle 1 passes by the stop line 91.

With such a configuration of the sixth alternative embodiment, even when the temporary stop notification output turns on as a result of detection of, for example, a temporary stop sign 90, but when the temporary stop sign 90 and a stop line 91 deviate from each other, in other words, even when the range in which the temporary stop sign notification function is activated and the range in which the automatic stop restricting function is activated deviate from each other, it is possible to deactivate the automatic stop restricting function in an appropriate area.

Next, a seventh alternative embodiment to the first embodiment will be described. In the first embodiment, the automatic stop restricting function is activated also in the second predetermined area 93; however, the disclosure is not limited to this configuration. The automatic stop restricting function may be deactivated when the host vehicle 1 has travelled a set distance L2 since the front end of the host vehicle 1 has entered the first predetermined area 92.

With such a configuration of the seventh alternative embodiment, it is possible to reduce deterioration in fuel efficiency due to a brief automatic engine stop and prevent slowness at the time of vehicle start with simple control in which the automatic stop-restart function is returned as long as the host vehicle 1 has traveled the set distance L2 based on a signal from, for example, the wheel speed sensor 34 since the front end of the host vehicle 1 has entered the first predetermined area 92.

Next, an eighth alternative embodiment to the first embodiment will be described. In the first embodiment, when the preceding vehicle 100 is no longer located in the first predetermined area 92, the automatic stop restricting function is returned. Because there can be, for example, traffic congestion on the intersecting road 56, permission of an automatic engine stop may be maintained when the automatic stop restricting function is once deactivated.

Next, a second embodiment will be described. The second embodiment differs from the first embodiment in that, when the host vehicle 1 is located in the first predetermined area 92, an automatic stop permission time period Tp from when the automatic stop condition is satisfied to when the engine 2 is automatically stopped is prolonged. Hereinafter, the description of a similar configuration to that of the first embodiment is omitted, and a configuration different from that of the first embodiment will be mainly described.

In the first embodiment, when the host vehicle 1 is located in the first predetermined area 92, an automatic stop of the engine 2, which is executed by the automatic stop-restart function, is prohibited except for the case where a preceding vehicle 100 is located in the first predetermined area 92. In contrast, in the second embodiment, when the host vehicle 1 is located in the first predetermined area 92, the S&S ECU 80 is configured to not prohibit an automatic stop of the engine 2 and is configured to prolong the automatic stop permission time period Tp from when the automatic stop condition is satisfied to when the engine 2 is automatically stopped.

Thus, in the second embodiment, even when the host vehicle 1 stops in the first predetermined area 92, the engine 2 is not automatically stopped in the automatic stop permission time period Tp from when the automatic stop condition is satisfied. Therefore, even when the host vehicle 1 starts moving just after making a stop, it is possible to reduce deterioration in fuel efficiency due to a brief automatic engine stop. In addition, when the host vehicle 1 remains stopped (the automatic stop condition is satisfied) after a lapse of the automatic stop permission time period Tp from when the host vehicle 1 has stopped (the automatic stop condition is satisfied) because of occurrence of traffic congestion, or the like, an automatic stop of the engine 2 is permitted. Therefore, in comparison with the case where an automatic stop of the engine 2 is prohibited as in the case of the first embodiment, it is possible to ensure an opportunity to improve fuel efficiency.

The frequency of stop of the vehicle 1 can vary depending on whether the vehicle 1 is close to or far from a temporary stop point. For example, when a line of vehicles is located in the first predetermined area 92, each vehicle is driven to start and stop in accordance with a start and stop of a preceding vehicle. Therefore, the frequency of stop of a vehicle in the rear side of the first predetermined area 92 where the number of preceding vehicles 100 counted from the temporary stop sign 90 (or the stop line 91) is large tends to be higher than the frequency of stop of a vehicle in the front side of the first predetermined area 92 where the number of preceding vehicles 100 is small. When a cycle of vehicle stop, brief automatic engine stop, engine restart and slowness of vehicle start is repeated in the rear side of the first predetermined area 92 where the frequency of stop is high, the driver may feel burdensome.

In the second embodiment, when the host vehicle 1 is located a first predetermined distance La or longer away from the temporary stop sign 90 (or the stop line 91) in the first predetermined area 92, the automatic stop permission time period Tp is extended. In addition, when the automatic stop condition is remains satisfied even after a lapse of the extended automatic stop permission time period Tp from when the automatic stop condition is satisfied, the automatic stop restricting function is deactivated.

Figure 8:
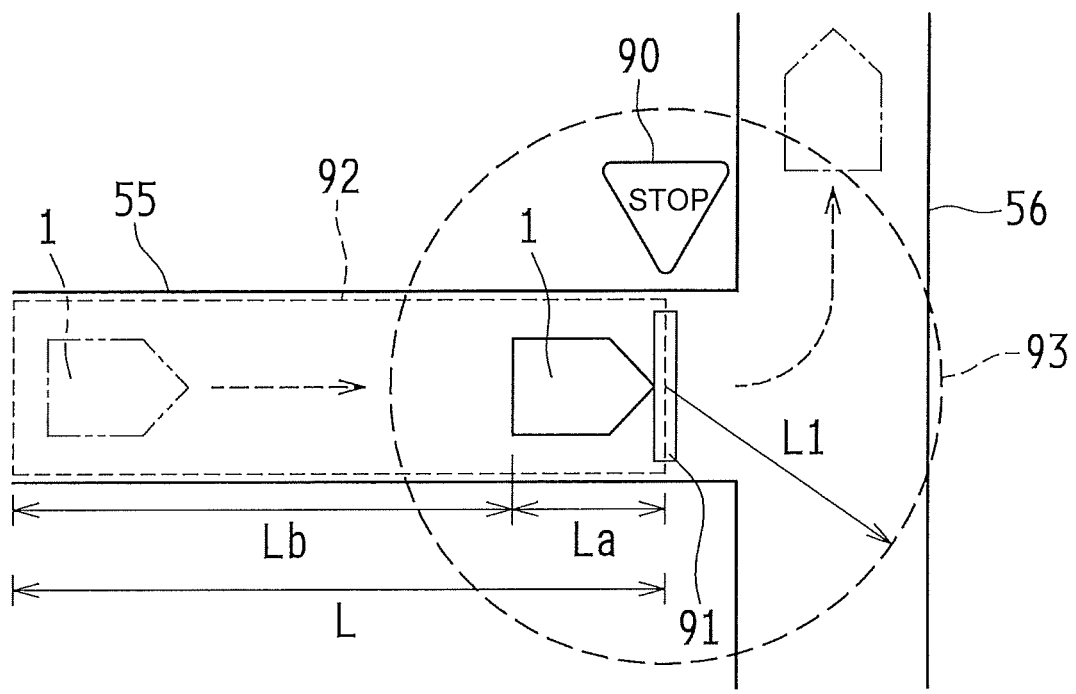
FIG. 8 is a view that schematically shows an example of a range in which an automatic stop restricting function according to a second embodiment of the disclosure is activated.

Specifically, as shown in FIG. 8, the S&S ECU 80 is configured to, when the host vehicle 1 is located in the first predetermined area 92 within the first predetermined distance La from the temporary stop sign 90 (or the stop line 91), set the automatic stop permission time period Tp to a first permission time period Ta and prolong the first permission time period Ta from when the automatic stop condition is satisfied to when the engine 2 is automatically stopped.

In the second embodiment, the length of the host vehicle is employed as the first predetermined distance La. The case where the host vehicle 1 is located within the first predetermined distance La means the case where at least part of the host vehicle 1 is located within the first predetermined distance La, in other words, the case where the host vehicle 1 is a lead vehicle. Thus, at the time when the host vehicle 1 that is a lead vehicle once stops before the stop line 91, it is possible to reduce deterioration in fuel efficiency due to a brief automatic engine stop and prevent slowness at the time of vehicle start. In addition, for example, when there is traffic congestion on the intersecting road 56, an automatic stop of the engine 2 is permitted after a lapse of the first permission time period Ta from when the host vehicle 1 has stopped. Therefore, it is possible to ensure an opportunity to improve fuel efficiency.

In the second embodiment, a first permission time period Ta from when the automatic stop condition is satisfied to when the engine 2 is automatically stopped is prolonged not only in the first predetermined area 92 but also in the second predetermined area 93 beyond the temporary stop sign 90 (or the stop line 91) (a range having the radius L1 (m) with the center set to the stop line 91). Thus, it is possible to deal with a two-stage start as well.

On the other hand, as shown in FIG. 8, the S&S ECU 80 is configured to, when the host vehicle 1 is located within the first predetermined distance La or longer (a range corresponding to a second predetermined distance Lb) away from the temporary stop sign 90 (or the stop line 91) in the first predetermined area 92, set the automatic stop permission time period Tp to a second permission time period Tb (>Ta) and prolong the second permission time period Tb from when the automatic stop condition is satisfied to when the engine 2 is automatically stopped. In this way, since the second permission time period Tb from when the automatic stop condition is satisfied to when the engine 2 is automatically stopped is prolonged, the second permission time Tb being longer than the first permission time period Ta, it is possible to reliably reduce a repetition of vehicle stop, brief automatic engine stop, engine restart and slowness at the time of vehicle start in the range corresponding to the second predetermined distance Lb and in which the frequency of stop is relatively high.

In addition, the S&S ECU 80 is configured to, when the automatic stop condition remains satisfied even after a lapse of the second permission time period Tb from when the automatic stop condition is satisfied, in other words, when there is a high possibility of occurrence of traffic congestion, deactivate the automatic stop restricting function. Deactivating the automatic stop restricting function in this case means that the engine 2 is automatically stopped thereafter as long as the automatic stop condition is satisfied without prolonging the second permission time period Tb from when the automatic stop condition is satisfied to when the engine is automatically stopped until the host vehicle 1 reaches a location shorter by the first predetermined distance La from the temporary stop sign 90 (or the stop line 91), in other words, until the host vehicle 1 becomes a lead vehicle. In this way, when there is a high possibility of occurrence of traffic congestion, the engine 2 is automatically stopped quickly when the automatic stop condition is satisfied. Therefore, it is possible to significantly improve fuel efficiency.

The electronic control unit 10 of the second embodiment has an automatic restart control function that, during an automatic engine stop in a state where there is a preceding vehicle 100, when a start of the preceding vehicle 100 has been detected, restarts the engine 2 even when the restart condition is not satisfied. Specifically, in the electronic control unit 10 of the second embodiment, the surroundings monitoring ECU 60 is configured to, when the surroundings monitoring ECU 60 detects a start of a preceding vehicle 100 based on, for example, image data from the camera 61, a detected signal from the millimeter-wave radar 62, or the like, or another signal, transmit the detected result to the meter ECU 70 and the S&S ECU 80.

The meter ECU 70 has a preceding vehicle start informing function that informs the driver via the display/buzzer 72 of a start of a preceding vehicle 100.

On the other hand, the S&S ECU 80 has the automatic restart control function that, when the preceding vehicle start informing function of the meter ECU 70 is activated after the engine 2 has been automatically stopped with the use of the automatic stop-restart function, restarts the engine 2 even when the restart condition is not satisfied. That is, in the second embodiment, the engine 2 is restarted when the restart condition is satisfied as a result of, for example, the off state of the brake due to driver's release of foot from the brake pedal 24 or when the preceding vehicle start informing function is activated, whichever comes first. Thus, for example, even when the driver forgets to release foot from the brake pedal 24, the engine 2 is restarted. Therefore, it is possible to restart the automatically stopped engine 2 at appropriate timing to follow the preceding vehicle 100, and it is possible to inform the driver of a start of the preceding vehicle 100.

Next, an example of the automatic stop-restart control that is executed by the electronic control unit 10 near a temporary stop point will be described with reference to the flowchart shown in FIG. 9.

Initially, in step SB1, the electronic control unit 10 determines whether the temporary stop sign notification mode is set. When negative determination is made in step SB1, the process directly returns. In the second embodiment, as well as the first embodiment, when the temporary stop sign notification mode is not selected by the driver, the electronic control unit 10 is configured to not activate the automatic stop restricting function even when the vehicle 1 approaches to a temporary stop point. On the other hand, when affirmative determination is made in step SB1, the process proceeds to step SB2.

In the next step SB2, the electronic control unit 10 determines whether a temporary stop sign 90 has been detected. When negative determination is made in step SB2, the process returns. On the other hand, when affirmative determination is made in step SB2, the process proceeds to step SB3.

In the next step SB3, the electronic control unit 10 determines whether the distance between the host vehicle 1 and the temporary stop sign 90 is shorter than or equal to L (m). Specifically, the surroundings monitoring ECU 60 measures a distance X between the temporary stop sign 90 and, for example, the front end of the host vehicle 1 based on, for example, image data from the camera 61, a detected signal from the millimeter-wave radar 62, or the like, or another signal, and determines whether the host vehicle 1 is located in the first predetermined area 92 (Distance X≤Distance L). When negative determination is made in step SB3, the process returns. On the other hand, when affirmative determination is made in step SB3, the process proceeds to step SB4.

In the next step SB4, the electronic control unit 10 determines whether temporary stop notification output to the driver is in the on state, in other words, whether the driver is actually informed via the display/buzzer 72 of an approach to the temporary stop point. When negative determination is made in step SB4, the process returns. In this case as well, as in the case of the first embodiment, the electronic control unit 10 is configured to not activate the automatic stop restricting function even at the time of an approach to the temporary stop point. On the other hand, when affirmative determination is made in step SB4, the process proceeds to step SB5. In the next step SB5, the electronic control unit 10 (S&S ECU 80) activates the automatic stop restricting (delaying) function (more accurately, set the automatic stop restricting (delaying) function to a ready state), the process proceeds to step SB6.

In the next step SB6, the electronic control unit 10 determines whether the host vehicle 1 has stopped based on, for example, a signal from the vehicle speed sensor 33 or the wheel speed sensor 34. When negative determination is made in step SB6, the process returns. On the other hand, when affirmative determination is made in step SB6, the process proceeds to step SB7.

In the next step SB7, the electronic control unit 10 determines whether the distance between the host vehicle 1 and the temporary stop sign 90 is shorter than the first predetermined distance La (m). Specifically, the surroundings monitoring ECU 60 measures the distance X between the temporary stop sign 90 and the front end of the host vehicle 1, and determines whether the distance X is shorter than the first predetermined distance La. When affirmative determination is made in step SB7, in other words, when the host vehicle 1 is a lead vehicle in the first predetermined area 92, the process proceeds to step SB8. In step SB8, the electronic control unit 10 (for example, the S&S ECU 80) stores an off state of a flag in, for example, the RAM, and then the process proceeds to step SB9. When the host vehicle 1 comes out of the first predetermined area 92, the host vehicle 1 temporarily stops in a state where the distance X is shorter than the first predetermined distance La. Therefore, the process finally proceeds to step SB8, and the off state of the flag is stored. As a result, the flag is set in the off state at the time of the start of the flowchart.

In contrast, when negative determination is made in step SB7, in other words, when the host vehicle 1 is located in the range corresponding to the second predetermined distance Lb shown in FIG. 8 in the first predetermined area 92, the process proceeds to step SB10. In the next step SB10, the electronic control unit 10 (for example, the S&S ECU 80) determines whether the flag is in the off state; however, as described above, the flag is in the off state at the time of the start of the flowchart, so affirmative determination is made in step SB10 for the first time, and then the process proceeds to step SB11. In the next step SB11, the electronic control unit 10 sets the automatic stop permission time period Tp to the second permission time period Tb (>Ta), and then the process proceeds to step SB12.

In the next step SB12, the electronic control unit 10 (S&S ECU 80) determines whether an elapsed time period T after a stop of the host vehicle 1 is shorter than the automatic stop permission time period Tp (the second permission time period Tb in step SB12 via step SB11) based on a time signal from the clock 84. When affirmative determination is made in step SB12, that is, when the second permission time period Tb has not elapsed yet after a stop of the host vehicle 1, the process proceeds to step SB13. In step SB13, an automatic stop of the engine 2 is prohibited, and then the process proceeds to step SB14.

In the next step SB14, the electronic control unit 10 (S&S ECU 80) determines whether the host vehicle 1 has started moving based on a signal from, for example, the wheel speed sensor 34. When negative determination is made in step SB14, the process returns. On the other hand, when affirmative determination is made in step SB14, the process proceeds to step SB15.

In contrast, when negative determination is made in step SB12, in other words, when the second permission time period Tb has elapsed from a stop of the host vehicle 1, the process proceeds to step SB17. In step SB17, the electronic control unit 10 (S&S ECU 80) automatically stops the engine 2, and then the process proceeds to step SB18.

In the next step SB18, the electronic control unit 10 determines whether a preceding vehicle 100 has started moving or when the restart condition is satisfied. Specifically, the surroundings monitoring ECU 60 detects a start of a preceding vehicle 100 based on, for example, image data from the camera 61, a detected signal from the millimeter-wave radar 62, or the like, or another signal. Thus, it is determined in step SB18 when the preceding vehicle start informing function of the meter ECU 70 is activated or when the restart condition is satisfied as a result of, for example, the off state of the brake due to driver's release of foot from the brake pedal 24. When negative determination is made in step SB18, the process returns. On the other hand, when affirmative determination is made in step SB18, the process proceeds to step SB19. In step SB19, the engine 2 is restarted, and the vehicle 1 starts moving. After that, the process proceeds to step SB20.

In the next step SB20, the electronic control unit 10 (S&S ECU 80) determines whether the automatic stop permission time period Tp is the second permission time Tb. When negative determination is made in step SB20, the process directly proceeds to step SB15. On the other hand, when affirmative determination is made in step SB20, the process proceeds to step SB21. In step SB21, the electronic control unit 10 (for example, the S&S ECU 80) stores an on state of the flag in, for example, the RAM, and then the process proceeds to step SB15.

In the next step SB15, the electronic control unit 10 determines whether the temporary stop notification output has changed from the on state to the off state and whether the distance from the temporary stop sign 90 is longer than or equal to L1 (m); however, as described above, when the vehicle 1 comes out of the first predetermined area 92, the vehicle 1 temporarily stops in a state where the distance X is shorter than the first predetermined distance La. Therefore, in a state where the automatic stop permission time period Tp is set to the second permission time period Tb, negative determination is ordinarily made in step SB15, and the process returns.

When the host vehicle 1 stops in step SB6 after the return and negative determination is made in step SB7, in other words, when the host vehicle 1 is still located in the range corresponding to the second predetermined distance Lb shown in FIG. 8, the process proceeds to step SB10. In the next step SB10, the electronic control unit 10 determines whether the flag is in the off state. When the flag is in the on state in step SB10, the process proceeds to step SB17. In step SB17, the engine 2 is automatically stopped. That is, when the elapsed time period T after a stop of the vehicle 1 once exceeds the second permission time period Tb, there is a high possibility of occurrence of traffic congestion. Therefore, while the vehicle is located in the range corresponding to the second predetermined distance Lb shown in FIG. 8, the engine 2 is quickly automatically stopped thereafter without delay when the automatic stop condition is satisfied.

On the other hand, when the host vehicle 1 stops in step SB6 after the return and affirmative determination is made in step SB7, in other words, when the host vehicle 1 becomes a lead vehicle in the first predetermined area 92, the process proceeds to step SB8. In step SB8, the electronic control unit 10 (for example, the S&S ECU 80) stores the off state of the flag, and then the process proceeds to step SB9.

In the next step SB9, the electronic control unit 10 (for example, the S&S ECU 80) sets the automatic stop permission time period Tp to the first permission time period Ta Tb), and then the process proceeds to step SB12. In the next step SB12, the electronic control unit 10 (S&S ECU 80) determines whether the elapsed time period T after a stop of the host vehicle 1 is shorter than the automatic stop permission time period Tp (the first permission time period Ta in step SB12 via step SB9) based on a time signal from the clock 84. When affirmative determination is made in step SB12, that is, when the first permission time period Ta has not elapsed yet after a stop of the host vehicle 1, the process proceeds to step SB13. In step SB13, an automatic stop of the engine 2 is prohibited even when the automatic stop condition is satisfied, and then the process proceeds to step SB14. When the host vehicle 1 is a lead vehicle, affirmative determination is made in step SB12 unless there is, for example, traffic congestion on the intersecting road 56.

In the next step SB14, the electronic control unit 10 (S&S ECU 80) determines whether the host vehicle 1 has started moving based on, for example, a signal from the wheel speed sensor 34. When negative determination is made in step SB14, the process returns. On the other hand, when affirmative determination is made in step SB14, the process proceeds to step SB15.

In the next step SB15, the electronic control unit 10 determines whether the temporary stop notification output has changed from the on state to the off state and whether the distance from the temporary stop sign 90 is longer than or equal to L1 (m). When negative determination is made in step SB15, the host vehicle 1 has not come out of the first predetermined area 92 or the second predetermined area 93 yet, so the process returns. On the other hand, when affirmative determination is made in step SB15, the process proceeds to step SB16. In step SB16, an automatic stop of the engine 2 is permitted (the engine 2 automatically stops when the automatic stop condition is satisfied), and then the process returns.

Next, a first alternative embodiment to the second embodiment will be described. In the second embodiment, the meter ECU 70 has the temporary stop sign notification function that informs the driver of an approach to a temporary stop point; however, the disclosure is not limited to this configuration. The meter ECU 70 does not need to have the temporary stop sign notification function.

Figure 9:
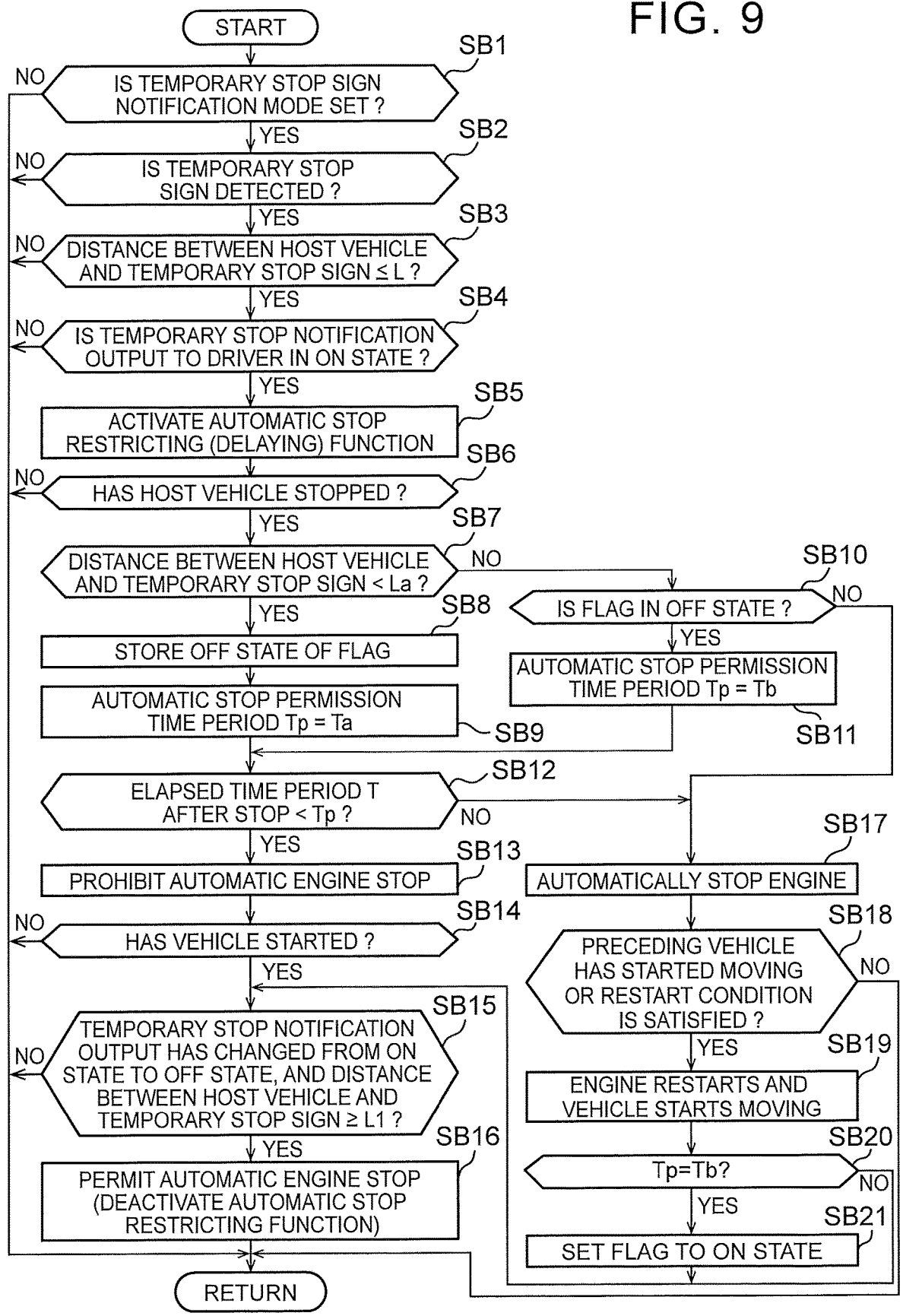
FIG. 9 is a flowchart that shows an example of automatic stop-restart control near a temporary stop point, that is, a point at which the vehicle should temporarily stop, in the second embodiment.
Figure 10:
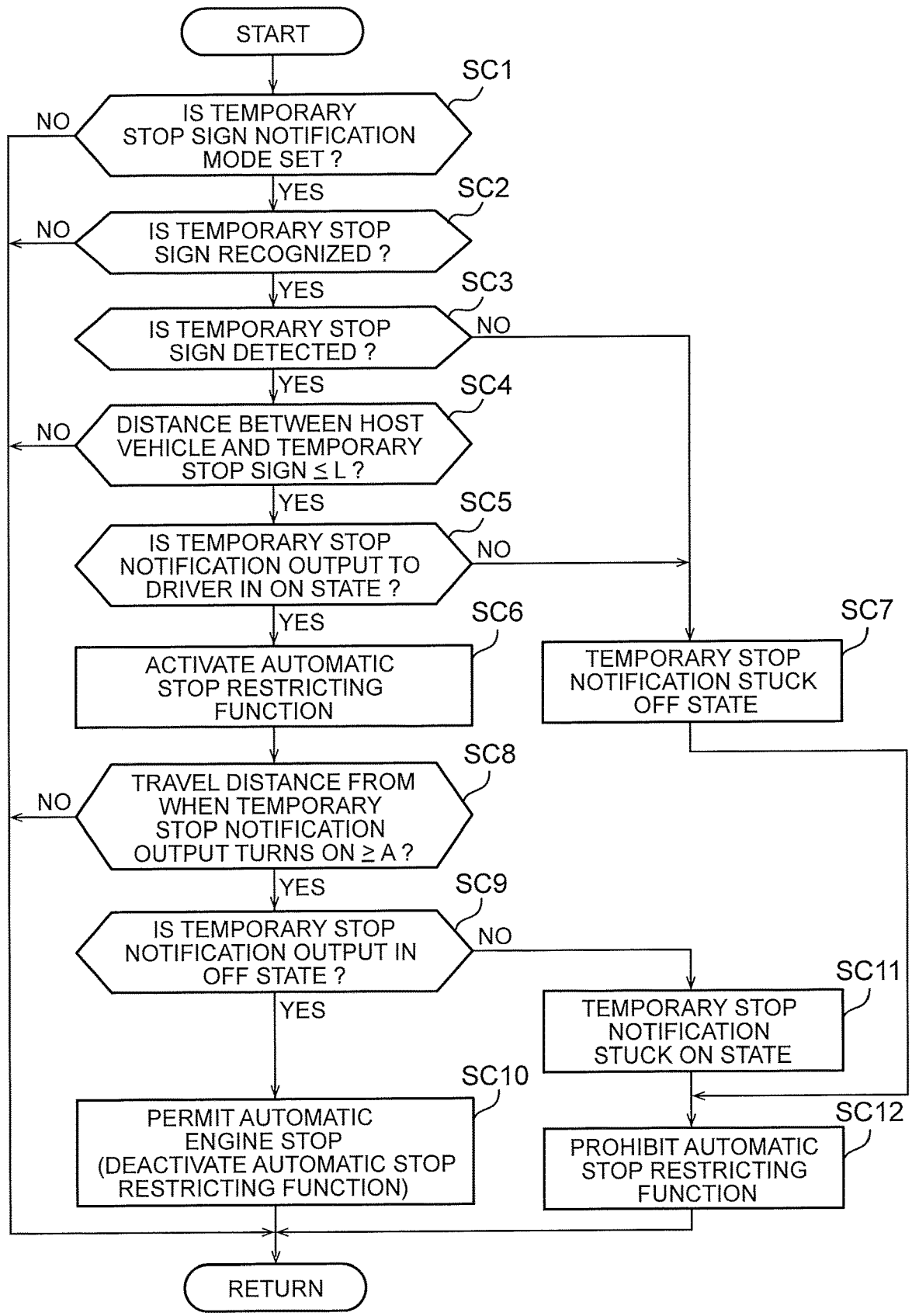
FIG. 10 is a flowchart that shows an example of automatic stop-restart control according to a third embodiment of the disclosure.

In this case, in the flowchart shown in FIG. 9, only by omitting step SB1 and step SB4, it is possible to delay an automatic stop of the engine 2 with the use of the automatic stop restricting function without informing the driver of an approach to the temporary stop point.

Next, a second alternative embodiment to the second embodiment will be described. In the second embodiment, the automatic stop restricting function is activated also in the second predetermined area 93; however, the disclosure is not limited to this configuration. For example, after the temporary stop notification output turns off, the automatic stop permission time period Tp may be extended to a third permission time period Tc, and the automatic stop restricting function may be maintained active until the third permission time period Tc from when the automatic stop condition is satisfied. The third permission time period Tc is set to a sufficiently long time to, after the host vehicle 1 passes by the temporary stop sign 90 or the stop line 91, drive the vehicle 1 to a point at which the intersecting road 56 can be definitely seen, stop the vehicle 1 again, and cause the vehicle 1 to start moving after confirming the safety on both right and left sides.

With this configuration, with simple control in which the automatic stop-restart function is returned as long as the third permission time period Tc has elapsed after the vehicle 1 has passed by the temporary stop sign 90 without detecting whether the vehicle 1 has come out of the second predetermined area 93, it is possible to reduce deterioration in fuel efficiency due to a brief automatic engine stop and prevent slowness at the time of vehicle start.

Next, a third alternative embodiment to the second embodiment will be described. In the second embodiment, when the automatic stop condition remains satisfied even after a lapse of the second permission time period Tb from when the automatic stop condition is satisfied, the engine 2 is automatically stopped thereafter as long as the automatic stop condition is satisfied until the host vehicle 1 becomes a lead vehicle; however, the disclosure is not limited to this configuration. An automatic stop of the engine 2 may be not permitted thereafter until the second permission time period Tb elapses.

The configurations of the third alternative embodiment, fourth alternative embodiment, fifth alternative embodiment, sixth alternative embodiment and seventh alternative embodiment to the first embodiment may be employed as alternative embodiments to the second embodiment.

Next, a third embodiment of the disclosure will be described. The third embodiment differs from the first embodiment, the second embodiment or any one of the alternative embodiments to the first and second embodiments in that the automatic stop-restart function is prohibited when a temporary stop notification stuck off state (described later) or a temporary stop notification stuck on state (described later) has occurred. Hereinafter, the description of a similar configuration to those of the first embodiment, the second embodiment or any one of the alternative embodiments to the first and second embodiments is omitted, and a configuration different from that of the first embodiment, the second embodiment or any one of the alternative embodiments to the first and second embodiments will be mainly described.

For example, because of a failure of the camera 61, soil on the lens of the camera 61, a communication error, a confusing sign, or the like, a temporary stop sign 90 can be not detected even at the time of an approach to the temporary stop sign 90. For this reason, the temporary stop notification output can remain in the off state (hereinafter, also referred to as temporary stop notification stuck off state). On the other hand, the temporary stop notification output can remain in the on state (hereinafter, also referred to as temporary stop notification stuck on state) even after the vehicle 1 has passed by a temporary stop sign 90. When there occurs a temporary stop notification stuck off state, an automatic stop of the engine 2 can be not restricted although the vehicle 1 is located in the first predetermined area 92. When there occurs a temporary stop notification stuck on state, an automatic stop of the engine 2 can be restricted although there is no temporary stop point.

In the third embodiment, the electronic control unit 10 is configured to, when the vehicle 1 has travelled a stuck on state determination distance A or longer in the on state of the temporary stop notification output, determine the status of the temporary stop notification output as a temporary stop notification stuck on state and prohibit the automatic stop restricting function.

Specifically, the electronic control unit 10 is configured to calculate a travel distance Y from when the temporary stop notification output turns on based on, for example, a detected result of the wheel speed sensor 34. When the calculated travel distance Y becomes longer than or equal to the stuck on state determination distance A, the electronic control unit 10 is configured to determine the status of the temporary stop notification output as a temporary stop notification stuck on state unless the temporary stop notification output turns off.

The stuck on state determination distance A is set to a sufficiently long distance (for example, 500 m) in order to make a careful determination. If there is another temporary stop sign, or the like, within the stuck on state determination distance A, it is difficult to determine whether the on state of the temporary stop notification output resulting from detection of the another temporary stop sign or a temporary stop notification stuck on state. For this reason, the stuck on state determination distance A may be set not only by distance simply and may be set by utilizing, for example, map information.

In the third embodiment, when the status of the temporary stop notification output is determined as a temporary stop notification stuck on state, the automatic stop restricting function is prohibited, and, in accordance with a rule, the engine 2 is automatically stopped when the predetermined automatic stop condition is satisfied.

On the other hand, the electronic control unit 10 is configured to, when the temporary stop notification output remains in the off state even at the time of an approach to a temporary stop sign 90, determine the status of the temporary stop notification output as a temporary stop notification stuck off state. Specifically, the electronic control unit 10 is configured to, when a temporary stop sign 90 is not detected by the camera 61 although the vehicle 1 approaches to the temporary stop sign 90 according to map information acquired by GPS, determine the status of the temporary stop notification output as a temporary stop notification stuck off state.

In the third embodiment, the electronic control unit 10 is configured to prohibit the automatic stop restricting function when the electronic control unit 10 determines the status of the temporary stop notification output as a temporary stop notification stuck off state as well, and, in accordance with a rule, automatically stop the engine 2 when the predetermined automatic stop condition is satisfied.

With these configurations, in the third embodiment, it is possible to reduce restrictions on an automatic stop of the engine 2 although there is no temporary stop point and prevent a discrepancy between a temporary stop notification and restrictions on an automatic stop of the engine 2.

Next, an example of automatic stop-restart control that is executed by the electronic control unit 10 in the temporary stop notification stuck on state will be described with reference to the flowchart shown in FIG. 9.

Initially, in step SC1, the electronic control unit 10 determines whether the temporary stop sign notification mode is set. When negative determination is made in step SC1, the process directly returns. On the other hand, when affirmative determination is made in step SC1, the process proceeds to step SC2.

In the next step SC2, the electronic control unit 10 determines whether a temporary stop sign 90 is recognized ahead of the vehicle 1. Specifically, the surroundings monitoring ECU 60 determines whether a temporary stop sign 90 is recognized based on, for example, current location information of the vehicle 1 from the navigation system 50. When negative determination is made in step SC2, the process returns. On the other hand, when affirmative determination is made in step SC2, the process proceeds to step SC3.

In the next step SC3, the electronic control unit 10 determines whether a temporary stop sign 90 has been detected ahead of the vehicle 1. Specifically, the surroundings monitoring ECU 60 determines whether a temporary stop sign 90 has been detected based on, for example, image data from the camera 61. When negative determination is made in step SC3, there is a difference between recognition of a temporary stop sign 90 based on current location information, or the like, and detection of a temporary stop sign 90 based on image data from the camera 61, so the process proceeds to step SC7. In step SC7, the status of the temporary stop notification output is determined as a temporary stop notification stuck off state, and then the process proceeds to step SC12.

In the next step SC12, the electronic control unit 10 prohibits the automatic stop restricting function, and, in accordance with a rule, automatically stops the engine 2 when the predetermined automatic stop condition is satisfied.

In contrast, when affirmative determination is made in step SC3, the process proceeds to step SC4. In the next step SC4, the electronic control unit 10 determines whether the distance between the host vehicle 1 and the temporary stop sign 90 is shorter than or equal to L (m). When negative determination is made in step SC4, the process returns. On the other hand, when affirmative determination is made in step SC4, the process proceeds to step SC5.

In the next step SC5, the electronic control unit 10 determines whether the temporary stop notification output to the driver is in the on state, in other words, whether the driver is actually informed via the display/buzzer 72 of an approach to the temporary stop point. When negative determination is made in step SC5, the process proceeds to step SC7. In step SC7, the status of the temporary stop notification output is determined as a temporary stop notification stuck off state, and then the process proceeds to step SC12. In the next step SC12, the electronic control unit 10 prohibits the automatic stop restricting function, and then the process returns.

On the other hand, when affirmative determination is made in step SC5, the process proceeds to step SC6. In step SC6, the electronic control unit 10 (S&S ECU 80) activates the automatic stop restricting (prohibiting or delaying) function, and then the process proceeds to step SC8.

In the next step SC8, the electronic control unit 10 determines whether the travel distance of the host vehicle 1 from when the temporary stop notification output to the driver turns on becomes longer than or equal to the stuck on state determination distance A (m) based on, for example, a signal from the wheel speed sensor 34. When negative determination is made in step SC8, the process returns. On the other hand, when affirmative determination is made in step SC8, the process proceeds to step SC9.

In the next step SC9, the electronic control unit 10 determines whether the temporary stop notification output is in the off state. When affirmative determination is made in step SC9, there is no abnormality, so the process proceeds to step SC10. In step SC10, an automatic stop of the engine 2 is permitted (the engine 2 is automatically stopped when the automatic stop condition is satisfied), and then the process returns.

In contrast, when negative determination is made in step SC9, the process proceeds to step SC11. In step SC11, the electronic control unit 10 determines the status of the temporary stop notification output as a temporary stop notification stuck on state, and then the process proceeds to step SC12. In the next step SC12, the electronic control unit 10 prohibits the automatic stop restricting function, and then the process returns.

Next, a fourth embodiment of the disclosure will be described. The fourth embodiment differs from the first embodiment, the second embodiment, the third embodiment or any one of the alternative embodiments these first to third embodiments in that whether the automatic stop-restart function is restricted or whether the automatic stop restricting function is deactivated is selectable based on a driver's intention. Hereinafter, the description of a similar configuration to that of the first embodiment, the second embodiment, the third embodiment or any one of the alternative embodiments to the first to third embodiments is omitted, and a configuration different from that of the first embodiment, the second embodiment, the third embodiment or any one of the alternative embodiments to the first to third embodiments will be mainly described.

In the first to third embodiments, the electronic control unit 10 is configured to, when the vehicle 1 has stopped in the first predetermined area 92, restrict (prohibit or delay) the automatic stop-restart function and deactivate the automatic stop restricting function through determination, or the like, made by the electronic control unit 10. In the fourth embodiment, the electronic control unit 10 is configured to restrict (prohibit or delay) the automatic stop-restart function and deactivate the automatic stop restricting function based on a driver's intention expressed through an operation of the brake pedal 24.

Specifically, the electronic control unit 10 (particularly, the S&S ECU 80) is configured to deactivate the automatic stop restricting function when a brake master cylinder pressure after a stop of the vehicle 1 becomes higher than a brake master cylinder pressure at the time when the vehicle 1 has stopped based on a detected value of the M/C pressure sensor 82. With this configuration, when the driver intends to activate the automatic stop-restart function when the vehicle 1 has stopped in the first predetermined area 92, the driver further depresses the brake pedal 24. As a result, the brake master cylinder pressure increases, and becomes higher than the brake master cylinder pressure at the time when the vehicle 1 has stopped. Therefore, it is possible to automatically stop the engine 2 based on a driver's intention.

Deactivation of the automatic stop restricting function by further depressing the brake pedal 24 after a stop of the vehicle 1 may be made known to the driver through, for example, specifications, or the like.

Next, other embodiments of the disclosure will be described. The disclosure is not limited to the embodiments, and may be implemented in various forms without departing from the spirit or main features thereof.

In each of the above embodiments, description is made in the case where the temporary stop point is around a temporary stop sign 90 and a stop line 91; however, the disclosure is not limited to this configuration. Similar control may be executed even when the temporary stop point is a point of frequent traffic accidents or a road marking other than a stop line 91.

In each of the above embodiments, the disclosure is applied to the vehicle 1 that includes a gasoline engine as the engine 2 and that includes a stepped transmission as the automatic transmission 4; however, the disclosure is not limited to this configuration. The disclosure may be applied to a vehicle that includes a diesel engine or a vehicle that includes a belt-type continuously variable transmission.

In each of the above embodiments, the disclosure is applied to the so-called conventional vehicle 1 on which only the engine 2 is mounted as a drive source; however, the disclosure is not limited to this configuration. As long as the engine 2 is provided as a drive source, the disclosure may be applied to, for example, a so-called hybrid vehicle that includes a motor generator as a drive source in addition to the engine 2.

In this way, the above-described embodiments are illustrative and not restrictive in all respects. The disclosure further encompasses all modifications and changes that belong to equivalents to the appended claims.

According to the disclosure, it is possible to ensure an opportunity to improve fuel efficiency while reducing deterioration in fuel efficiency due to a brief automatic engine stop and prevent slowness at the time of vehicle start, so it is exceedingly advantageous in application to a control system for a vehicle that has an automatic stop-restart function.

What is claimed is:

1. A control system for a vehicle, comprising:
   an electronic control unit disposed in the vehicle and configured to:
   (i) have an automatic stop-restart function that automatically stops an engine when a predetermined automatic stop condition is satisfied and that restarts the engine when a predetermined restart condition is satisfied during an automatic engine stop;
   (ii) have an automatic stop restricting function that prohibits an automatic stop of the engine when the vehicle is located at a first position that is less than a predetermined distance from a temporary stop point;
   (iii) determine, when the vehicle is located at the first position, whether there is another vehicle that travels ahead of the vehicle and is located at a second position that is between the vehicle and the temporary stop point; and
   (iv) deactivate the automatic stop restricting function when the electronic control unit determines that the another vehicle is located at the second position regardless of whether the automatic stop of the engine is prohibited by the automatic stop restricting function.

2. The control system according to claim 1, wherein the electronic control unit is configured to have an automatic restart control function that restarts the engine even when the predetermined restart condition is not satisfied, during an automatic engine stop in a state where the another vehicle is located at the second position, when a start of the another vehicle has been detected.

3. The control system according to claim 1, wherein the temporary stop point is at least one of a point of frequent traffic accidents, a point of a temporary stop sign, a railroad crossing, and a point at which a road marking including a stop line is painted.

4. The control system according to claim 1, wherein the electronic control unit is configured to:
   (i) have a notification function that informs a driver of a fact that the vehicle is located at the first position; and
   (ii) maintain the automatic stop restricting function active until notification output made by the notification function turns off.

5. The control system according to claim 4, wherein the electronic control unit is configured to prohibit the automatic stop restricting function when the vehicle has travelled a third predetermined distance or longer in a state where the notification function is active.

6. The control system according to claim 1, wherein the electronic control unit is configured to:
   (i) have a notification function that informs a driver of a fact that the vehicle is located at the first position; and
   (ii) maintain the automatic stop restricting function active until notification output made by the notification function turns off and the vehicle passes by the temporary stop point.

7. The control system according to claim 1, wherein the electronic control unit is configured to:
   (i) have a notification function that informs a driver of a fact that the vehicle is located at the first position;
   (ii) after notification output made by the notification function turns off, extend a predetermined time period from when the predetermined automatic stop condition is satisfied to when the engine is automatically stopped; and (iii) maintain the automatic stop restricting function active until the extended predetermined time period elapses from when the predetermined automatic stop condition is satisfied.

8. The control system according to claim 1, wherein the electronic control unit is configured to maintain the automatic stop restricting function active until the vehicle passes by the temporary stop point and the vehicle is located a second predetermined distance or longer away from the temporary stop point.

9. A control system for a vehicle, comprising:
an electronic control unit configured to:
(i) have an automatic stop-restart function that automatically stops an engine when a predetermined automatic stop condition is satisfied and that restarts the engine when a predetermined restart condition is satisfied during an automatic engine stop;
(ii) have an automatic stop restricting function that, when the vehicle is located at a first position that is less than a predetermined distance from a temporary stop point, prolongs a predetermined time period from when the predetermined automatic stop condition is satisfied to when the engine is automatically stopped; and
(iii) deactivate the automatic stop restricting function when another vehicle that travels ahead of the vehicle is located at a second position that is between the vehicle and the temporary stop point.

10. The control system according to claim 9, wherein the electronic control unit is configured to have an automatic restart control function that restarts the engine even when the predetermined restart condition is not satisfied, during an automatic engine stop in a state where the another vehicle is located the second position, when a start of the another vehicle has been detected.

11. The control system according to claim 9, wherein the temporary stop point is at least one of a point of frequent traffic accidents, a point of a temporary stop sign, a railroad crossing, and a point at which a road marking including a stop line is painted.

12. The control system according to claim 9, wherein the electronic control unit is configured to:
(i) have a notification function that informs a driver of a fact that the vehicle is located at the first position; and
(ii) maintain the automatic stop restricting function active until notification output made by the notification function turns off.

13. The control system according to claim 9, wherein the electronic control unit is configured to:
(i) have a notification function that informs a driver of a fact that the vehicle is located at the first position; and
(ii) maintain the automatic stop restricting function active until notification output made by the notification function turns off and the vehicle passes by the temporary stop point.

14. The control system according to claim 13, wherein the electronic control unit is configured to prohibit the automatic stop restricting function when the vehicle has travelled a third predetermined distance or longer in a state where the notification function is active.

15. The control system according to claim 9, wherein the electronic control unit is configured to:
(i) have a notification function that informs a driver of a fact that the vehicle is located at the first position;
(ii) after notification output made by the notification function turns off, extend the predetermined time period; and (iii) maintain the automatic stop restricting function active until the extended predetermined time period elapses from when the predetermined automatic stop condition is satisfied.

16. The control system according to claim 9, wherein the electronic control unit is configured to maintain the automatic stop restricting function active until the vehicle passes by the temporary stop point and the vehicle is located a second predetermined distance or longer away from the temporary stop point.

17. A control system for a vehicle, comprising:
an electronic control unit configured to:
(i) have an automatic stop-restart function that automatically stops an engine when a predetermined automatic stop condition is satisfied and that restarts the engine when a predetermined restart condition is satisfied during an automatic engine stop;
(ii) have an automatic stop restricting function that, when the vehicle is located at a first position that is less than a first predetermined distance from a temporary stop point, prolongs a predetermined time period from when the predetermined automatic stop condition is satisfied to when the engine is automatically stopped; and
(iii) extend the predetermined time period when the vehicle is located between the first position and a second position that is a second predetermined distance or longer away from the temporary stop point.

18. The control system according to claim 17, wherein the second predetermined distance is a length of the vehicle.

19. The control system according to claim 17, wherein the electronic control unit is configured to have an automatic restart control function that restarts the engine even when the predetermined restart condition is not satisfied, during an automatic engine stop in a state where a another vehicle that travels ahead of the vehicle is located at a third position that is between the vehicle and the temporary stop point, when a start of the another vehicle has been detected.

20. The control system according to claim 17, wherein the temporary stop point is at least one of a point of frequent traffic accidents, a point of a temporary stop sign, a railroad crossing, and a point at which a road marking including a stop line is painted.

21. The control system according to claim 17, wherein the electronic control unit is configured to:
(i) have a notification function that informs a driver of a fact that the vehicle is located at the first position; and
(ii) maintain the automatic stop restricting function active until notification output made by the notification function turns off.

22. The control system according to claim 17, wherein the electronic control unit is configured to:
(i) have a notification function that informs a driver of a fact that the vehicle is located at the first position; and
(ii) maintain the automatic stop restricting function active until notification output made by the notification function turns off and the vehicle passes by the temporary stop point.

23. The control system according to claim 17, wherein the electronic control unit is configured to:
(i) have a notification function that informs a driver of a fact that the vehicle is located at the first position;
(ii) after notification output made by the notification function turns off, extend the predetermined time period; and (iii) maintain the automatic stop restricting function active until the extended predetermined time period elapses from when the predetermined automatic stop condition is satisfied.

24. The control system according to claim 23, wherein the electronic control unit is configured to prohibit the automatic stop restricting function when the vehicle has travelled a third predetermined distance or longer in a state where the notification function is active.

25. The control system according to claim 17, wherein the electronic control unit is configured to maintain the automatic stop restricting function active until the vehicle passes by the temporary stop point and the vehicle is located a fourth predetermined distance or longer away from the temporary stop point.

* * * * *